(12) United States Patent
Matsumi et al.

(10) Patent No.: US 6,295,406 B1
(45) Date of Patent: *Sep. 25, 2001

(54) DIGITAL SIGNAL RECORDING APPARATUS FOR SAMPLING AND COMPRESSING SIGNALS ACCORDING TO VARIOUS RECORDING MODES

(75) Inventors: Chiyoko Matsumi, Suita; Tatsuro Juri, Osaka; Akira Iketani, Higashiosaka; Makoto Goto; Susumu Yamaguchi, both of Nishinomiya; Hideki Otaka, Neyagawa; Shigeru Awamoto, Osaka; Masakazu Nishino, Kashiwara; Takao Kashiro, Kadoma; Tadashi Ono, Tsuzuki-gun, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,078

(22) Filed: Nov. 26, 1997

Related U.S. Application Data

(62) Division of application No. 08/532,424, filed on Sep. 22, 1995, now abandoned.

(30) Foreign Application Priority Data

| | | | |
|---|---|---|---|
| Sep. 26, 1994 | (JP) | ................................................ | 6-229544 |
| Sep. 28, 1994 | (JP) | ................................................ | 6-233828 |
| Oct. 7, 1994 | (JP) | ................................................ | 6-243810 |
| Dec. 8, 1994 | (JP) | ................................................ | 6-304639 |
| Apr. 7, 1995 | (JP) | ................................................ | 7-082247 |
| May 22, 1995 | (JP) | ................................................ | 7-148231 |

(51) Int. Cl.$^7$ ................................................ H04N 9/825
(52) U.S. Cl. ................................................ 386/44; 386/67
(58) Field of Search ................................................ 386/1, 33, 40, 386/44, 46, 67, 109, 124, 111, 112; H04N 9/79, 9/825

(56) References Cited

U.S. PATENT DOCUMENTS

| | | | |
|---|---|---|---|
| 4,613,908 | * | 9/1986 | Takahashi et al. ..................... 386/21 |
| 4,862,292 | * | 8/1989 | Enari et al. .............................. 360/8 |

(List continued on next page.)

FOREIGN PATENT DOCUMENTS

| | | |
|---|---|---|
| 40 14744 | 11/1990 | (DE) . |
| 43 21 488 | 1/1994 | (DE) . |

(List continued on next page.)

OTHER PUBLICATIONS

European Search Report dated Apr. 16, 1997.

(List continued on next page.)

*Primary Examiner*—Young Lee
(74) *Attorney, Agent, or Firm*—Ratner & Prestia

(57) ABSTRACT

The digital signal recording apparatus of the invention for recording a video signal on a recording medium, includes: a mode setting section for setting a recording mode, the recording mode being one of a standard recording mode and a long-time recording mode having a longer recording time than that of the standard recording mode; a sampling section for sampling the video signal at a sampling number corresponding to the recording mode set by the mode setting section, the sampling number when the selected recording mode is the long-time recording mode being smaller than the sampling number when the selected recording mode is the standard recording mode; a coding section for coding the video signal sampled by the sampling section at a compression rate corresponding to the recording mode set by the mode setting section, the compression rate when the selected recording mode is the long-time recording mode being higher than the compression rate when the selected recording mode is the standard recording mode; and a recording section for recording the video signal coded by the coding section on a recording medium.

7 Claims, 20 Drawing Sheets

U.S. PATENT DOCUMENTS

| | | | |
|---|---|---|---|
| 4,963,992 | * 10/1990 | Doi et al. | 386/109 |
| 5,253,122 | * 10/1993 | Chiba et al. | 386/124 |
| 5,257,107 | * 10/1993 | Hwang et al. | 386/33 |
| 5,283,659 | * 2/1994 | Akiyama et al. | 386/33 |
| 5,335,116 | 8/1994 | Onishi et al. . | |
| 5,377,051 | 12/1994 | Lane et al. . | |
| 5,416,651 | * 5/1995 | Uetake et al. | 360/48 |
| 5,430,579 | 7/1995 | Onishi et al. . | |
| 5,465,180 | * 11/1995 | Amanda et al. | 386/112 |
| 5,475,439 | * 12/1995 | Shimokoriyama | 348/493 |

FOREIGN PATENT DOCUMENTS

| | | |
|---|---|---|
| 0421417 | 4/1991 | (EP) . |
| 0421417 A2 | 4/1991 | (EP) . |
| 0 430 043 | 6/1991 | (EP) . |
| 0 541 029 | 5/1993 | (EP) . |
| 0 551 944 | 7/1993 | (EP) . |
| 0 556 816 | 8/1993 | (EP) . |
| 0 559 467 | 9/1993 | (EP) . |
| 0 570 964 | 11/1993 | (EP) . |
| 0 579 411 | 1/1994 | (EP) . |
| 0 600 495 | 6/1994 | (EP) . |
| 0 603 808 | 6/1994 | (EP) . |
| 0 618 725 | 10/1994 | (EP) . |
| 0 625 850 | 11/1994 | (EP) . |
| 60-167165 | 8/1985 | (JP) . |
| 5-183869 | 7/1993 | (JP) . |
| 6-38248 | 2/1994 | (JP) . |

OTHER PUBLICATIONS

European Search Report dated Jan. 30, 1997.

Office Action dated Aug. 3, 1999 for related application #98 118 775.

* cited by examiner

FIG. 6

13.5MHz 10.125MHz

Macro block (6Y+C$_R$+C$_B$)

DIGITAL SIGNAL RECORDING APPARATUS FOR SAMPLING AND COMPRESSING SIGNALS ACCORDING TO VARIOUS RECORDING MODES

This application is a division of application Ser. No. 08/532,424 filed Sep. 22, 1995 now abandoned.

BACKGROUND OF THE INVENTION

1. Field of the Invention

The present invention relates to a digital signal recording apparatus for recording a digital signal such as an audio signal. More specifically, the present invention relates to a digital signal recording apparatus for performing a recording operation in a standard recording mode and a long-time recording mode in which information can be recorded on one and the same recording medium for a time longer than that of the standard recording mode.

2. Description of the Related Art

In recent years, various recording and reproducing apparatuses have been remarkably developed in order to improve the quality of a video by using digital coding technologies. Under these circumstances, a digital video cassette recorder (VCR) is expected to be a next-generation VCR which is sure to replace a currently used analog VCR in the near future. In order to realize a home-use digital VCR, the information is required to be recorded in a smaller-sized cassette for a long time. Accordingly, it is indispensable to introduce high-efficiency coding technologies into such a digital VCR for reducing the amount of information of the digital video signal while preventing considerable degradation in the quality of the video. A standard format of the home-use digital VCR (DVCR) utilizing the high-efficiency coding technologies is published in the "Basic Specifications for Consumer-Use Digital VCR" by HD Digital VCR Conference in August 1993. This DVCR can record a currently used TV signal in compliance with a REC601 standard on a magnetic tape at a data rate of 25 Mbps.

Hereinafter, the operation of such a DVCR will be briefly described. When the currently used TV signal to be input is an analog signal, the analog signal is A/D converted and then filtered so that the sampling ratio among a luminance (Y) signal, a first color difference (R-Y) signal and a second color difference (B-Y) signal becomes 4:1:1 in the horizontal direction. Needless to say, when the input TV signal is a digital signal, there is no need for the A/D conversion. Thereafter, the order of the signals is changed and a predetermined video signal processing such as a compression processing is performed depending upon the necessity, thereby outputting a video data. In this case, an important data, such as a data indicating whether the input video is to be reproduced in an NTSC mode or in a PAL mode, which is indispensable for reproducing the video data will be called an "auxiliary data". The auxiliary data is inserted into the video data. Thereafter, an error correction coding is performed and the video data is modulated by a modulator so as to be converted into a recording signal suitable for a magnetic recording. Then, the signal is recorded on a magnetic tape. According to the basic specifications for consumer-use digital VCR, a NTSC TV signal is recorded by dividing one frame into ten tracks.

In a generally used DVCR, a track is composed of a predetermined number of sectors and gaps between adjacent sectors, and a sector is composed of a predetermined number of synch blocks, run-ups, guards and the like. Tracking information, an audio data, a video data, a sub-code data and the like are assigned in the respective sectors. An auxiliary data is assigned and inserted into the identical sector where the audio data and the video data are assigned.

It is generally considered to be indispensable for a recording apparatus for recording a video signal to edit various data on a field basis or on a frame basis. Therefore, not only a video data and an audio data but also a sub-code data and an auxiliary data can be edited as a whole on a field basis or on a frame basis. In order to realize such editing, a field address for identifying a field, a track address determined by regarding one field as a period, and a block address determined by regarding one track as a period are generally provided. Alternatively, a frame address for identifying a frame, a track address determined by regarding one frame as a period, and a block address determined by regarding one track as a period can also be provided.

As described in Japanese Patent Application No. 6-38248 entitled "Digital Signal Recording and Reproducing Method", the auxiliary data is periodically recorded at respectively different positions in the respective tracks in order to eliminate the influence of a burst error, a scratch and the like on a magnetic tape and to obtain the data easily during a trick play reproduction.

In a currently used VTR of a VHS system, a video data can be recorded in following two recording modes, i.e., a standard recording mode and a three-time-longer recording mode in which a video data can be recorded on one and the same tape for a time three times as long as the time in the standard recording mode. Therefore, in practically using a home-use DVCR, the video data is frequently required to be recorded in a long-time (e.g., three-time-longer) recording mode rather in the standard recording mode.

A DVCR allowing for recording a data in a long-time recording mode by a high-efficiency coding technique is disclosed, for example, in Japanese Laid-Open Patent Publication No. 5-183869 entitled "Digital Video Signal Recording Apparatus". In the technique disclosed in the patent publication, the ratio of the sampling numbers for the luminance signal in the standard recording mode with respect to the long-time recording mode is set to be 3:2. However, if the sampling frequency for the luminance signal in the standard recording mode is 13.5 MHz, for example, then the luminance signal in the long-time recording mode has a frequency band of 9 MHz. As a result, the resolution obtained in the long-time recording mode becomes inferior to that obtained by a conventional analog S-VHS. In addition, according to the standard REC601, the sampling ratio among the luminance signal, the first color difference signal and the second color difference signal is set to be 4:1:1 in recording the currently used TV signal in the standard recording mode by using a home-use DVCR. In this case, if the sampling frequency for the luminance signal in the long-time recording mode is set to be two-thirds of the sampling frequency for the luminance signal in the standard recording mode, then the sampling ratio becomes (8/3):1:1, so that it becomes very difficult to use a common circuit by way of a blocking or the like in both modes.

In addition, in the case where a block having the same addresses as those of a block for the standard recording mode is used in the long-time recording mode, then a correct frame cannot be designated by a frame address. Furthermore, if a signal for the standard recording mode and a signal for the long-time recording mode are tried to be continuously recorded on one and the same tape by inserting an auxiliary data into a frame by beginning with the position of the head track of the frame for both the signals, then the auxiliary data can not be inserted periodically. As a result, an error is likely to be caused in detecting the auxiliary data immediately after scanning the boundary between the recording region for a standard recording mode and the recording region for a long-time recording mode during the reproducing operation, and an algorithm for detecting the position of the auxiliary data becomes more complicated, so that the size of the circuit becomes disadvantageously increased and the delay in the detection time is increased.

It cannot be identified whether the reproduced data is recorded in the standard recording mode or in the long-time recording mode until the contents of the auxiliary data are examined. Therefore, in the case where detection errors are successively caused in a trick play reproduction, in particular, the reproduction processing is likely to be performed by mistaking a signal recorded in the long-time recording mode for a signal recorded in the standard recording mode, and a large defect is possibly generated in the video reproduced on a screen.

Recently, as well as the currently used standard TV signal, an HDTV signal and a signal for a 16:9 wide screen TV have been more and more practically used. Therefore, a home-use DVTR allowing for recording the plural kinds of TV signals in common will be required in the near future. It is possible to commonly perform the signal processing and use the same recording head between the format for recording the standard TV signal and the format for recording the HDTV signal after the variable-length coding has been performed. However, it is difficult to commonly use the other portions of the circuit, because the number of the blocks per segment of the currently used TV signal, i.e., 6 blocks×5=30, is different from the number of the blocks per segment of the HDTV signal, i.e., 8 blocks×5=40. If independent circuits are provided for the respective TV signals, then the cost of the apparatus is adversely increased, so that it becomes very difficult to use such an apparatus as a home-use apparatus.

SUMMARY OF THE INVENTION

According to the present invention, a digital signal recording apparatus for recording a video signal on a recording medium is provided. The digital signal recording apparatus includes: a mode setting section for setting a recording mode, the recording mode being one of a standard recording mode and a long-time recording mode having a longer recording time than that of the standard recording mode; a sampling section for sampling the video signal at a sampling number corresponding to the recording mode set by the mode setting section, the sampling number when the selected recording mode is the long-time recording mode being smaller than the sampling number when the selected recording mode is the standard recording mode; a coding section for coding the video signal sampled by the sampling section at a compression rate corresponding to the recording mode set by the mode setting section, the compression rate when the selected recording mode is the long-time recording mode being higher than the compression rate when the selected recording mode is the standard recording mode; and a recording section for recording the video signal coded by the coding section on a recording medium.

In one embodiment, the sampling number when the selected recording mode is the long-time recording mode is substantially equal to two-thirds of the sampling number when the selected recording mode is the standard recording mode.

In another embodiment, the compression rate when the selected recording mode is the long-time recording mode is substantially equal to four-thirds of the compression rate when the selected recording mode is the standard recording mode.

In still another embodiment, the video signal includes a luminance signal and a color difference signal. The sampling section includes: a luminance signal sampling section for sampling the luminance signal at a sampling frequency corresponding to the recording mode set by the mode setting section; a line decimating section for decimating lines with respect to the color difference signal; and a section for selectively outputting one of the color difference signal and a color difference signal with the lines decimated by the line decimating section in accordance with the recording mode set by the mode setting section.

In still another embodiment, the sampling frequency when the selected recording mode is the long-time recording mode is substantially equal to three-quarters of the sampling frequency when the selected recording mode is the standard recording mode.

In still another embodiment, the sampling frequency when the selected recording mode is the long-time recording mode is 10.125 MHz, and the sampling frequency when the selected recording mode is the standard recording mode is 13.5 MHz.

In still another embodiment, the video signal includes a luminance signal and a color difference signal. And the sampling section includes: a rate change section for changing a rate at which the luminance signal is sampled; a section for selectively outputting one of the luminance signal and a luminance signal with the rate changed by the rate change section in accordance with the recording mode set by the mode setting section; a line decimating section for decimating lines with respect to the color difference signal; and a section for selectively outputting one of the color difference signal and a color difference signal with the lines decimated by the line decimating section in accordance with the recording mode set by the mode setting section.

According to another aspect of the present invention, a digital signal recording apparatus for recording a video signal on a recording medium is provided. The digital signal recording apparatus includes: a mode setting section for setting a recording mode, the recording mode being one of a standard recording mode and a long-time recording mode having a longer recording time than that of the standard recording mode; a sampling section for sampling the video signal at a sampling number corresponding to the recording mode set by the mode setting section, the sampling number when the selected recording mode is the long-time recording mode being smaller than the sampling number when the selected recording mode is the standard recording mode; a restraining section for restraining a gain of the video signal sampled by the sampling section in a frequency band exceeding a predetermined frequency, the gain when the selected recording mode is the long-time recording mode being smaller than the gain when the selected recording mode is the standard recording mode; a coding section for coding the video signal with the gain restrained by the restraining section at a compression rate corresponding to the recording mode set by the mode setting section, the compression rate when the selected recording mode is the long-time recording mode being higher than the compression rate when the selected recording mode is the standard recording mode; and a recording section for recording the video signal coded by the coding section on a recording medium.

According to still another aspect of the present invention, a digital signal recording apparatus for recording a video signal on a recording medium, in a case where a number of horizontal effective pixels of the video signal is not N (an integer) times as large as a number of horizontal pixels of a macro block, or in a case where a number of vertical effective pixels of the video signal is not N times as large as a number of vertical pixels of a macro block, is provided. The digital signal recording apparatus includes: a dividing section for dividing the video signal into a plurality of macro blocks; a judging section for judging whether each of the plurality of macro blocks corresponds to an extra portion of the horizontal effective pixels or an extra portion of the vertical effective pixels; a generating section for generating a pseudo macro block having a predetermined pixel value; a selection section for selecting one of the macro block divided by the dividing section and the pseudo macro block generated by the generating section based on a result obtained by the judging section; a coding section for coding the macro block selected by the selection section; and a recording section for recording the video signal coded by the coding section on a recording medium.

In one embodiment, all pixel values in the pseudo macro block generated by the generating section are equal.

In another embodiment, the pseudo macro block generated by the generating section consists of a plurality of small blocks, and the small blocks respectively have different pixel values in the pseudo macro block.

According to still another aspect of the present invention, a digital signal recording apparatus for recording a digital signal on a recording medium is provided. The digital signal recording apparatus includes: a mode setting section for setting a recording mode, the recording mode being one of a standard recording mode and a long-time recording mode having a longer recording time than that of the standard recording mode; a coding section for coding the digital signal so as to have a data amount corresponding to the recording mode set by the mode setting section, the data amount when the selected recording mode is the long-time recording mode being smaller than the data amount when the selected recording mode is the standard recording mode; an auxiliary data adding section for adding an auxiliary data to the data coded by the coding section in accordance with the recording mode set by the mode setting section; and a recording section for recording the data to which the auxiliary data is added on the recording medium.

In one embodiment, the auxiliary data adding section includes: an auxiliary data generating section for generating an auxiliary data in accordance with the recording mode set by the mode setting section; a control section for generating a control signal indicating a position to which the auxiliary data is inserted in accordance with the recording mode set by the mode setting section; and an auxiliary data inserting section for inserting the auxiliary data into the coded data at the insertion position indicated by the control signal. The insertion position of the auxiliary data is controlled by the control section so that the auxiliary data is inserted at a predetermined period, irrespective of whether the selected recording mode is the long-time recording mode or the standard recording mode.

In another embodiment, the recording section divides and records the data to which the auxiliary data is added on m×(2n+1) tracks (where m is 2, 4, 6, . . . and n is 1, 2, 3, . . . ) on the recording medium when the selected recording mode is the standard recording mode, while the recording section divides and records the data to which the auxiliary data is added on 2n+1 tracks on the recording medium when the selected recording mode is the long-time recording mode.

According to still another aspect of the present invention, a digital signal recording apparatus for recording a digital signal on a recording medium is provided. The digital signal recording apparatus includes: a mode setting section for setting a recording mode, the recording mode being one of a standard recording mode and a long-time recording mode having a longer recording time than that of the standard recording mode; a coding section for coding the digital signal so as to have a data amount corresponding to the recording mode set by the mode setting section, the data amount when the selected recording mode is the long-time recording mode being 1/n as small as the data amount when the selected recording mode is the standard recording mode; and a recording section for recording the coded data on a recording medium having a plurality of tracks. The recording section includes: an address generating section for generating a track address designating one of the plurality of tracks in accordance with the recording mode set by the mode setting section, the address generating section generating a track address cyclicly repeated at a period of n frames when the selected recording mode is the long-time recording mode and a track address cyclicly repeated at a period of one frame when the selected recording mode is the standard recording mode; and an address adding section for adding the track address to the coded data.

In one embodiment, the address generating section further generates a frame address for identifying each frame of the video signal.

In another embodiment, the address generating section generates a track address having an identical value with respect to two adjacent tracks having respectively different azimuths among the plurality of tracks.

In still another embodiment, in the case of recording a currently used TV signal having 525 lines and 60 fields, the recording section records the n frames of the TV signal on ten tracks, while in the case of recording a currently used TV signal having 625 lines and 50 fields, the recording section records the n frames of the TV signal on twelve tracks.

In still another embodiment, n=1 in the standard recording mode, and n=2 in the long-time recording mode.

According to still another aspect of the present invention, a digital signal recording apparatus for recording a digital signal on a recording medium is provided. The digital signal recording apparatus includes: a signal mode setting section for setting a signal mode, the signal mode being one of a HDTV signal mode, a wide TV signal mode, and a standard TV signal mode; an A/D converting section for analog/digital converting a video signal by sampling the video signal including a luminance signal, a first color difference signal and a second color difference signal at a sampling frequency corresponding to the signal mode set by the signal mode setting section, a ratio among a sampling frequency when the signal mode is the HDTV signal mode, a sampling frequency when the signal mode is the wide TV signal mode, and a sampling frequency when the signal mode is the standard TV signal mode being 4:2:1; an effective pixel extracting section for extracting effective pixels from the digitized video signal at a sampling number corresponding to the signal mode set by the signal mode setting section, a ratio among a sampling number when the signal mode is the HDTV signal mode, a sampling number when the signal mode is the wide TV signal mode, and a sampling number when the signal mode is the standard TV signal mode being 4:2:1; a blocking section for dividing a pixel data output from the effective pixel extracting section into rectangular blocks on a screen with respect to the luminance signal and the first and the second color difference signals; a macro blocking section for composing one macro block by assembling blocks of the luminance signal, the first color difference signal and the second color difference signal which are located at the same position on the screen; a segmentalizing section for composing one segment by assembling a predetermined number of macro blocks; a coding section for coding the segment, an amount of a coded data being controlled to be substantially equal to a predetermined amount on a segment basis; and a recording section for recording the data coded by the coding section on a recording medium having a plurality of tracks in accordance with the signal mode set by the signal mode setting section, the recording section recording the coded data on a number 4n (n is a positive integer) of tracks per frame when the signal mode is the HDTV signal mode; on a number 2n of tracks per frame when the signal mode is the wide TV signal mode; and on a number n of tracks per frame when the signal mode is the standard TV signal mode.

In one embodiment, the A/D converting section samples the luminance signal at 40.5 MHz and the first and the second color difference signals at 13.5 MHz when the signal mode is the HDTV signal mode; samples the luminance signal at 20.25 MHz and the first and the second color difference signals at 6.75 MHz when the signal mode is the wide TV signal mode; and samples the luminance signal at 10.125 MHz and the first and the second color difference signals at 3.375 MHz when the signal mode is the standard TV signal mode.

In another embodiment, a ratio among a number of the horizontal effective pixels extracted by the effective pixel extracting section from the video signal when the signal mode is the HDTV signal mode, a number of the horizontal effective pixels extracted by the effective pixel extracting section from the video signal when the signal mode is the wide TV signal mode and a number of the horizontal effective pixels extracted by the effective pixel extracting section from the video signal when the signal mode is the standard TV signal mode is 2:2:1, and a ratio among a number of vertical effective lines extracted by the effective pixel extracting section from the video signal when the signal mode is the HDTV signal mode, a number of vertical effective lines extracted by the effective pixel extracting section from the video signal when the signal mode is the wide TV signal mode and a number of vertical effective lines extracted by the effective pixel extracting section from the video signal when the signal mode is the standard TV signal mode is 2:1:1.

In a digital signal recording apparatus according to the present invention, when the input video signal is recorded in a long-time recording mode, by reducing the sampling number as compared with the sampling number in a standard recording mode and increasing the compression rate, the amount of the information to be recorded in the long-time recording mode is made smaller than the amount to be recorded in the standard recording mode. As a result, it is possible to record the information on one and the same recording medium for a longer time.

In addition, by restraining a high-frequency band of the video signal, a larger amount of information can be assigned in a low-frequency band which is important for the visual impression of the video. As a result, even when a video recorded in the long-time recording mode is reproduced, a video of sufficiently high quality can be obtained by a home-use apparatus.

Furthermore, in a digital signal recording apparatus according to the present invention, it is possible to simplify the high efficiency coding processing in the long-time recording mode. Even when the signals in different recording modes are recorded on an identical recording medium, the auxiliary data can be inserted periodically. As a result, it is possible to prevent an error in detecting the auxiliary data and generate a correct track address in the long-time recording mode. Moreover, in order to implement an apparatus having such a configuration, it is not necessary to considerably increase the size of the circuit. Therefore, the recording apparatus of this invention can attain much practical effect.

In addition, in a digital signal recording apparatus according to the present invention, in the case of recording a video signal by digitizing the signal and utilizing a high efficiency coding technique, the processing of the signals can be commonly performed in a HDTV signal recording mode, a wide TV signal recording mode and a standard TV signal recording mode. As a result, most portions of the circuit can be commonly used for processing the signals, and a sufficiently wide band and an allowable video quality can be obtained in the standard TV signal recording mode. Accordingly, the recording apparatus of this invention can be utilized very effectively in practical use.

Thus, the invention described herein makes possible the advantage of providing a digital signal recording apparatus allowing for recording a digital data in a long-time recording mode in which the data can be recorded on a recording medium for a time longer than that of the standard recording mode.

This and other advantages of the present invention will become apparent to those skilled in the art upon reading and understanding the following detailed description with reference to the accompanying figures.

BRIEF DESCRIPTION OF THE DRAWINGS

FIG. 6 is a schematic diagram illustrating a rate change processing to be performed in the second and fourth preferred embodiments of the present invention.

DESCRIPTION OF THE PREFERRED EMBODIMENTS

Hereinafter, the present invention will be described by way of illustrative examples with reference to the accompanying drawings.

EXAMPLE 1

Figure 1:
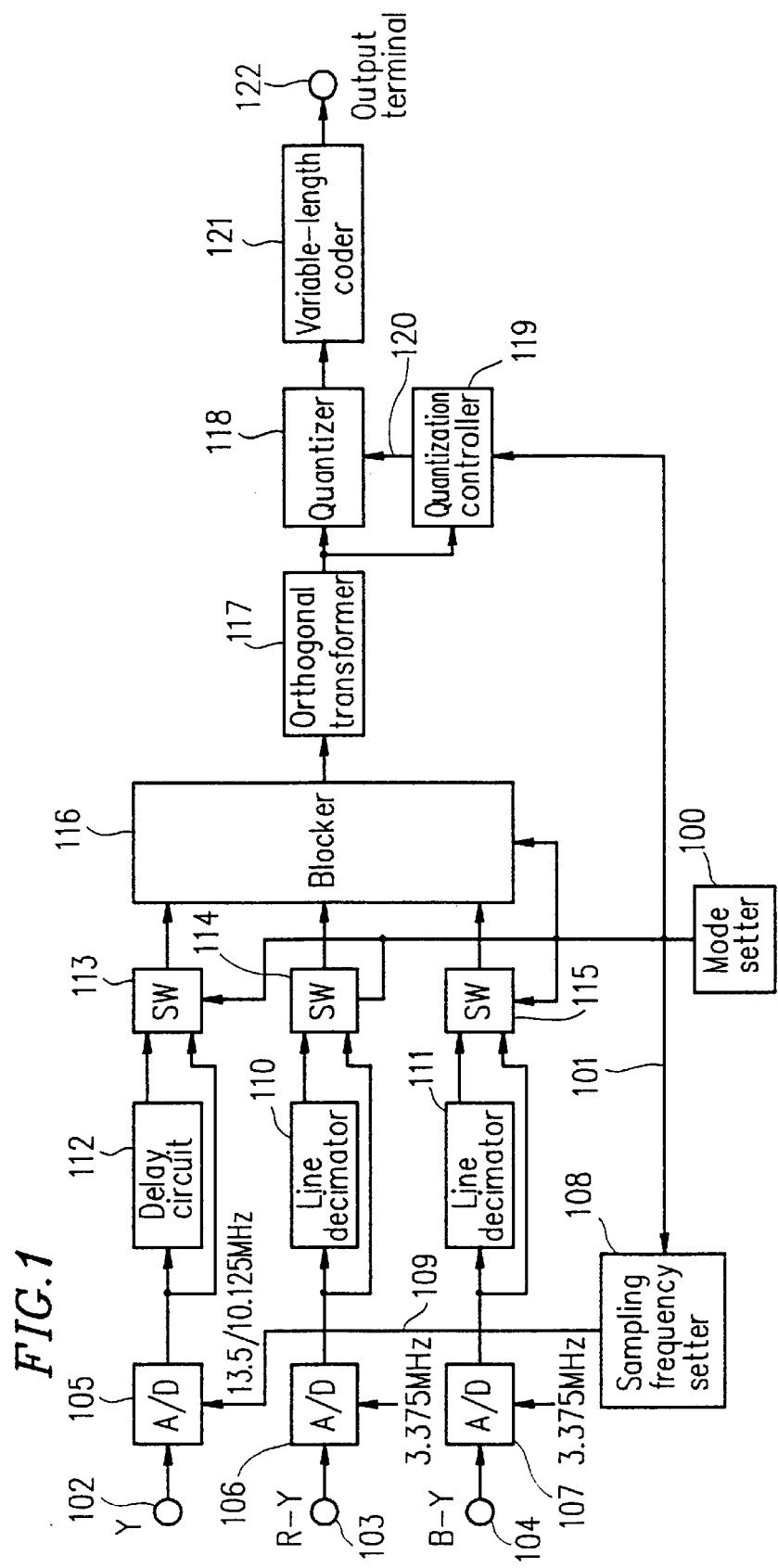
FIG. 1 is a block diagram showing a configuration for a digital signal recording apparatus according to a first preferred embodiment of the present invention.

FIG. 1 is a block diagram showing a configuration for a digital signal recording apparatus according to a first example of the present invention. It is noted that the components having the same configuration or function will be denoted by the same reference numerals in the following description.

The digital signal recording apparatus includes a mode setter 100 for setting the recording mode to be either one of a standard recording mode and a long-time recording mode. The mode setter 100 outputs mode information 101 indicating the set mode. In accordance with the mode information 101, the digital signal recording apparatus processes a luminance signal Y, a color difference signal (R-Y) and a color difference signal (B-Y) to be input through input terminals 102, 103 and 104 respectively. After these signals are variable-length coded, a video signal is output through an output terminal 122 by the digital signal recording apparatus.

The digital signal recording apparatus further includes A/D converters 105, 106 and 107 and a sampling frequency setter 108. The inputs of the A/D converters 105, 106 and 107 are connected with the input terminals 102, 103 and 104, respectively. The A/D converters 105, 106 and 107 convert an analog signal into a digital signal. A clock 109 is supplied from the sampling frequency setter 108 to the A/D converter 105. The sampling frequency of the A/D converter 105 is set by the clock 109 and is variable. On the other hand, the sampling frequencies of the A/D converters 106 and 107 are fixed.

The digital signal recording apparatus further includes: a delay circuit 112; line decimators 110 and 111; and switches 113, 114 and 115. The delay circuit 112 is connected with the output of the A/D converter 105, thereby delaying the luminance signal by a time corresponding to the processing time of the line decimators 110 and 111. The line decimator 110 is connected with the output of the A/D converter 106, and decimates the color difference signal (R-Y) on a line basis after limiting the vertical band of the color difference signal (R-Y) to one half. The line decimator 111 is connected with the output of the A/D converter 107, and decimates the color difference signal (B-Y) on a line basis after limiting the vertical band of the color difference signal (B-Y) to one half. The input of the switch 113 is connected with the output of the A/D converter 105 and the output of the delay circuit 112, thereby outputting either the output of the A/D converter 105 or the output of the delay circuit 112 in accordance with the mode information 101. The input of the switch 114 is connected with the output of the A/D converter 106 and the output of the line decimator 110, thereby outputting either the output of the A/D converter 106 or the output of the line decimator 110 in accordance with the mode information 101. The input of the switch 115 is connected with the output of the A/D converter 107 and the output of the line decimator 111, thereby outputting either the output of the A/D converter 107 or the output of the line decimator 111 in accordance with the mode information 101.

The digital signal recording apparatus further includes: a blocker 116; an orthogonal transformer 117; a quantizer 118; a quantization controller 119; and a variable-length coder 121. The blocker 116 is connected with the outputs of the switches 113, 114 and 115, and forms a block consisting of 64 pixels, i.e., eight horizontal pixels×eight vertical lines, from the signals input in the order of the raster scanning in accordance with the mode information 101, thereby outputting a signal on a block basis. The orthogonal transformer 117 performs a two-dimensional orthogonal transform on a block basis consisting of (8×8) pixels. The quantizer 118 quantizes the output of the orthogonal transformer 117. The quantization step in the quantizer 118 is determined by the quantization information 120 output from the quantization controller 119. The quantization controller 119 determines the quantization step in the quantizer 118 in accordance with the mode information 101 so that the amount of the data after the high-efficiency coding becomes a predetermined amount or less. The variable-length coder 121 variable-length codes the output of the quantizer 118. The variable-length coded video signal is output through an output terminal 122.

Hereinafter, the operation of the digital signal recording apparatus of this example having the above configuration will be described.

The mode setter 100 sets the mode information 101 to be "0" in the standard recording mode and "1" in the long-time recording mode. The selected mode information 101 is supplied to the sampling frequency setter 108, the switches 113, 114 and 115, the blocker 116 and the quantization controller 119.

The luminance signal Y and the color difference signals (R-Y) and (B-Y) input through the terminals 102, 103 and 104 are converted into digital signals by the A/D converters 105, 106 and 107, respectively. The sampling frequency setter 108 outputs a clock 109 having a different frequency to the A/D converter 105 in accordance with the mode information 101. The sampling frequency for the luminance signal in the A/D converter 105 is determined by the clock 109. The clock 109 is set so as to have a frequency of 13.5 MHz in the standard recording mode and a frequency of 10.125 MHz in the long-time recording mode. That is to say, the sampling frequency for the luminance signal in the long-time recording mode is set to be three-quarters of the sampling frequency for the luminance signal in the standard recording mode. The sampling frequency for the color difference signals is always fixed at 3.375 MHz in both the modes.

When the mode information 101 is set to be "0", the switches 113, 114 and 115 are controlled to select the outputs of the A/D converters 105, 106 and 107. On the other hand, when the mode information 101 is set to be "1", the switches 113, 114 and 115 are controlled to select the output of the delay circuit 112 and those of the line decimators 110 and 111. Therefore, the outputs of the A/D converters 105, 106 and 107 are input to the blocker 116 in the standard recording mode, while the outputs of the delay circuit 112 and the line decimators 110 and 111 are input to the blocker 116 in the long-time recording mode.

Figure 2A:
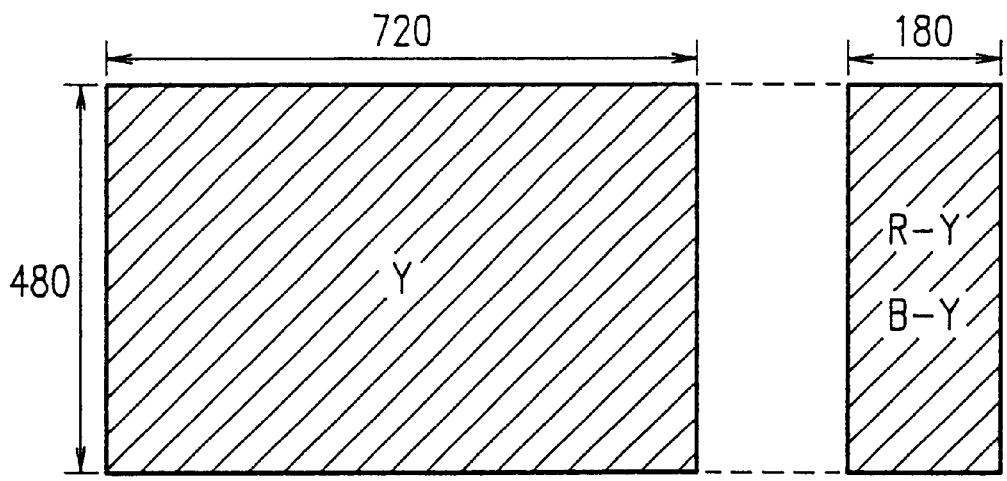
FIG. 2A is a schematic diagram showing a sampling number per frame in the standard recording mode.

FIG. 2A shows the sampling number of a unit frame to be input to the blocker 116 in the standard recording mode. As shown in FIG. 2A, the sampling number per frame in the standard recording mode is: 720 pixels×480 lines+180 pixels×480 lines×2=518400 samples/frame.

Figure 2B:
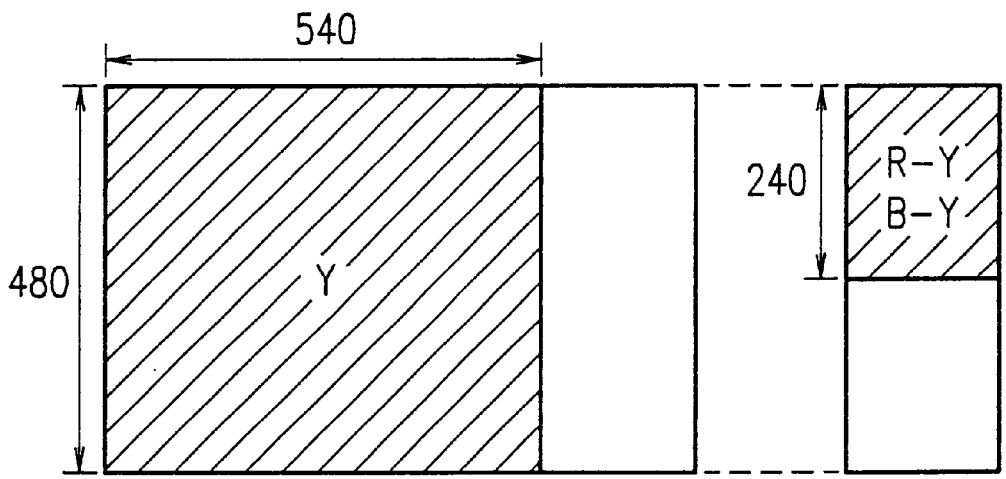
FIG. 2B is a schematic diagram showing a sampling number per frame in the long-time recording mode.

FIG. 2B shows the sampling number of a unit frame to be input to the blocker 116 in the long-time recording mode. As shown in FIG. 2B, the sampling number per frame in the long-time recording mode is: 540 pixels×480 lines+180 pixels×240 lines×2=345600 samples/frame. Accordingly, the total number of the samples in the long-time recording mode is two-thirds of the sampling number in the standard recording mode.

The blocker 116 blocks the luminance signal and the color difference signals which have been input in the order of the raster scanning. Each of the blocks consists of 64 pixels, i.e., eight horizontal pixels×eight vertical lines, and then outputs a signal on a five macro block basis. The macro block is herein composed of the blocks for the luminance signal and the blocks for the color difference signals which are located at the same position on the screen.

Figure 3:
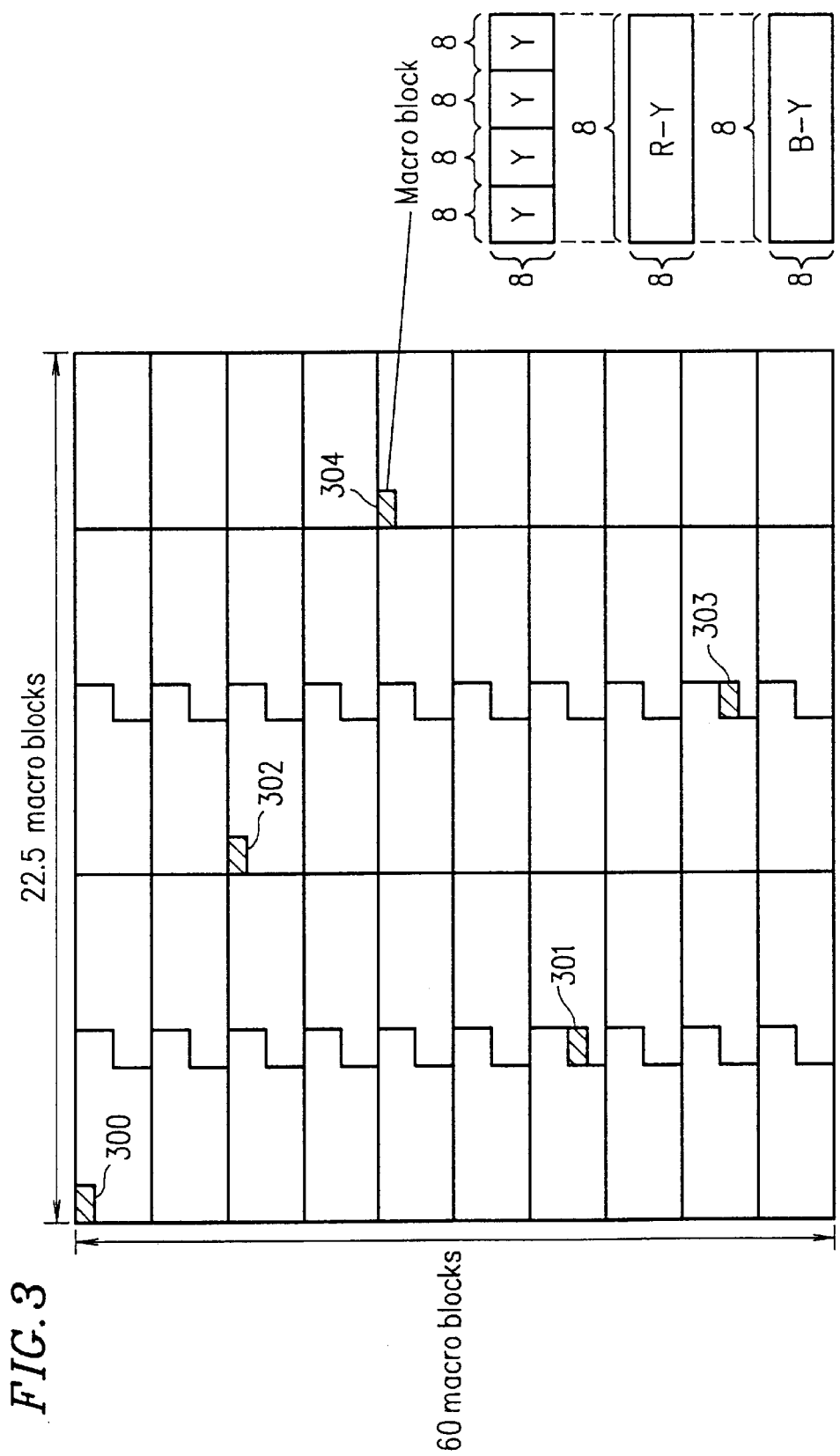
FIG. 3 is a schematic diagram showing macro blocks composing a video segment in the standard recording mode.

FIG. 3 shows the macro blocks to be output from the blocker 116 as a unit (hereinafter, referred to as a "video segment") for the high-efficiency coding in the standard recording mode. In this example, one video segment consists of five macro blocks 300, 301, 302, 303 and 304. Each of the macro blocks 300, 301, 302, 303 and 304 consists of six blocks, i.e., four luminance signal blocks, one R-Y color difference signal block and one B-Y color difference signal block. Therefore, one video segment consists of thirty blocks.

Figure 4:
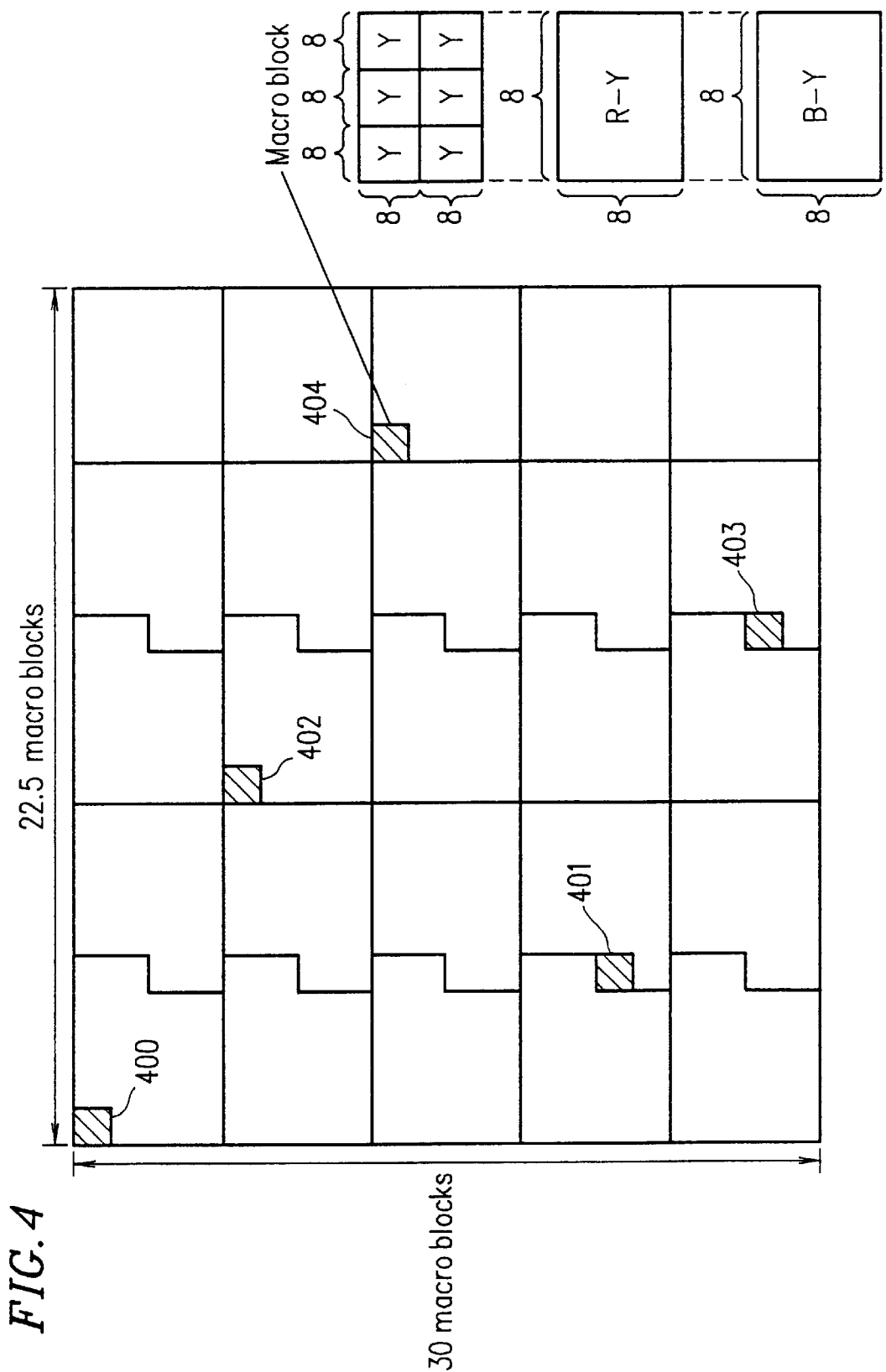
FIG. 4 is a schematic diagram showing macro blocks composing a video segment in the long-time recording mode.

FIG. 4 shows the macro blocks to be output from the blocker 116 as a video segment in the long-time recording mode. In this example, one video segment consists of five macro blocks 400, 401, 402, 403 and 404. Each of the macro blocks 400, 401, 402, 403 and 404 consists of eight blocks, i.e., six luminance signal blocks, one R-Y color difference signal block and one B-Y color difference signal block. Therefore, one video segment consists of forty blocks. The number of the video segments per frame and the number of the macro blocks per frame in the long-time recording mode are one half as small as the number of the video segments per frame and the number of the macro blocks per frame in the standard recording mode, respectively.

The data output from the blocker 116 on the video segment basis is input to the orthogonal transformer 117 and an (8×8) two-dimensional orthogonal transform is performed therein. The coefficient obtained by the two-dimensional orthogonal transform is quantized by the quantizer 118. The quantization step in the quantizer 118 is determined by the quantization controller 119. The quantization controller 119 determines the quantization step so that the data amount after the data in one video segment has been coded becomes equal to or less than a predetermined data amount. That is to say, the coefficients of the respective blocks are quantized at a predetermined number of quantization steps, the amount of the data to be generated during the variable-length coding is presumed, and the quantization steps are determined so that the data amount after the coding becomes a predetermined amount or less. The coefficients quantized at the determined quantization steps are variable-length coded based on a Huffman table by the variable-length coder 121.

As described referring to FIGS. 3 and 4, the number of the blocks per video segment is 30 in the standard recording mode and 40 in the long-time recording mode. On the other hand, the amount of the coded data in one video segment is controlled to be equal in both the modes by the quantization controller 119. As a result, the compression rate in the long-time recording mode becomes four-thirds of the compression rate in the standard recording mode.

The data high-efficiency coded by the above-described method is output from the code-word output terminal 122. A parity for an error correction coding is added to the coded signal if necessary, and then recorded on a recording medium.

As is apparent from the foregoing description, according to the method of this example, the sampling frequency of the A/D conversion for the luminance signal in the long-time recording mode is set to be three-quarters of the sampling frequency of the A/D conversion for the luminance signal in the standard recording mode; the lines are decimated with respect to the color difference signals, thereby reducing the data amount to two-thirds before the high-efficiency coding is performed; and the number of the blocks per video segment in the long-time recording mode is set to be four-thirds of the number of the blocks per video segment in the standard recording mode, thereby setting the compression rate in the long-time recording mode to be four-thirds of the compression rate in the standard recording mode, so that it is possible to reduce the amount of the data to be recorded in the long-time recording mode to be one half of the amount of the data to be recorded in the standard recording mode.

EXAMPLE 2

Figure 5:
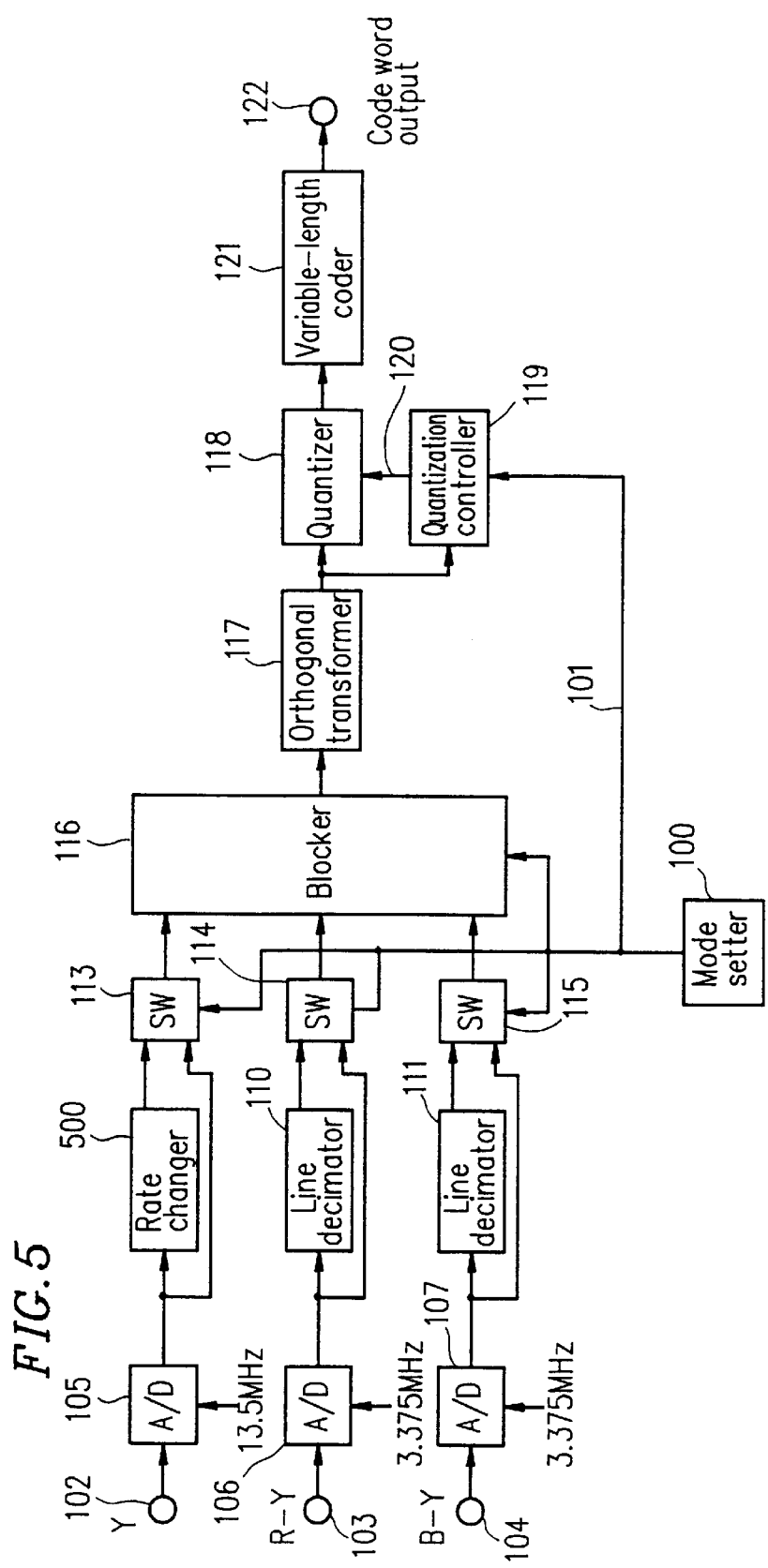
FIG. 5 is a block diagram showing a configuration for a digital signal recording apparatus according to a second preferred embodiment of the present invention.

FIG. 5 is a block diagram showing a configuration for a digital signal recording apparatus according to a second example of the present invention. The digital signal recording apparatus of this example includes a rate changer 500 instead of the delay circuit 112.

In the first example, the sampling frequency for the luminance signal in the A/D converter 105 is selected in accordance with the mode information 101. On the other hand, in this example, the sampling frequency for the luminance signal in the A/D converter 105 is fixed at 13.5 Mhz irrespective of the mode information 101. In the long-time recording mode, by A/D converting the luminance signal and then changing the rate of the luminance signal by using the rate changer 500, the sampling number of the luminance signal in the long-time recording mode can be reduced to three-quarters of the sampling number of the luminance signal in the standard recording mode.

Figure 6:
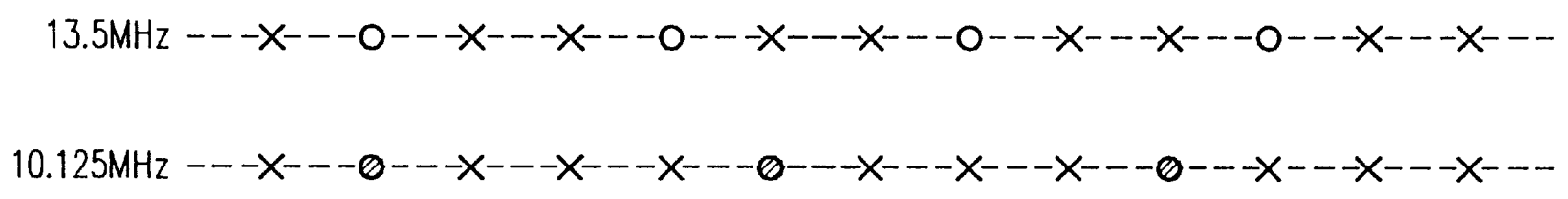

FIG. 6 illustrates the rate change operation performed by the rate changer 500. In FIG. 6, the open circles indicate the sampled values when the sampling frequency is 13.5 MHz. The rate changer 500 calculates the sampled values, indicated by the closed circles, corresponding to the sampling frequency of 10.125 MHz by using the sampled values indicated by the open circles. After the rate is changed, the digital signal recording apparatus of this example operates in the same way as the digital signal recording apparatus of the first example. Therefore, the description thereof will be omitted herein.

As described above, according to the method of this example, the clock supplied to the A/D converter 105 in the standard recording mode can be commonly used in the long-time recording mode, too. As a result, by using a digital processing portion only, the video data can be satisfactorily processed in the long-time recording mode.

EXAMPLE 3

Figure 7:
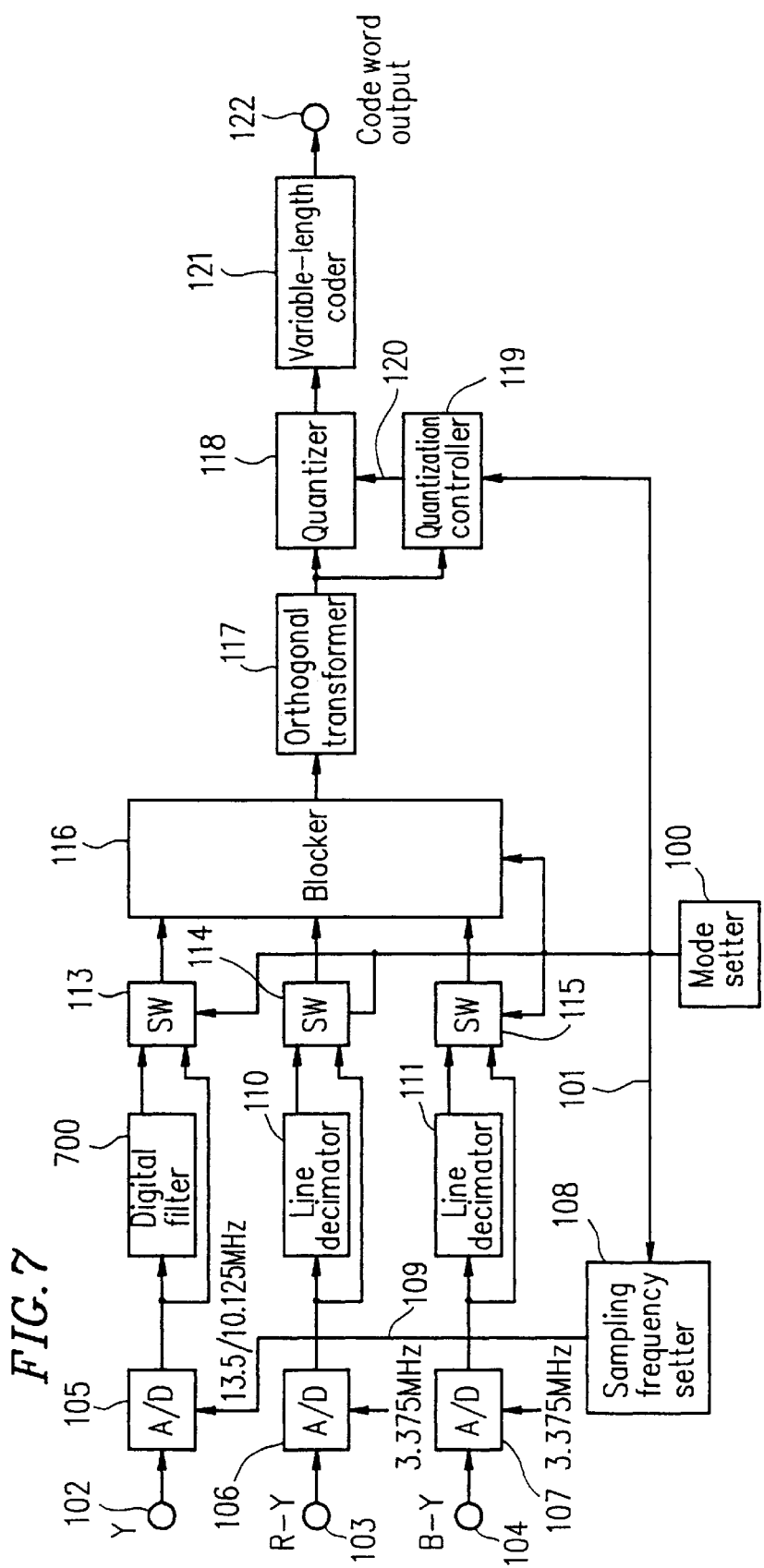
FIG. 7 is a block diagram showing a configuration for a digital signal recording apparatus according to a third preferred embodiment of the present invention.

FIG. 7 is a block diagram showing a configuration for a digital signal recording apparatus according to a third example of the present invention. The digital signal recording apparatus of this example includes a digital filter 700 instead of the delay circuit 112.

The method of the third example is different from the method of the first example in that the luminance signal is A/D converted and then the frequency components of the luminance signal in the high-pass band are restrained by using the digital filter 700.

Figure 8:
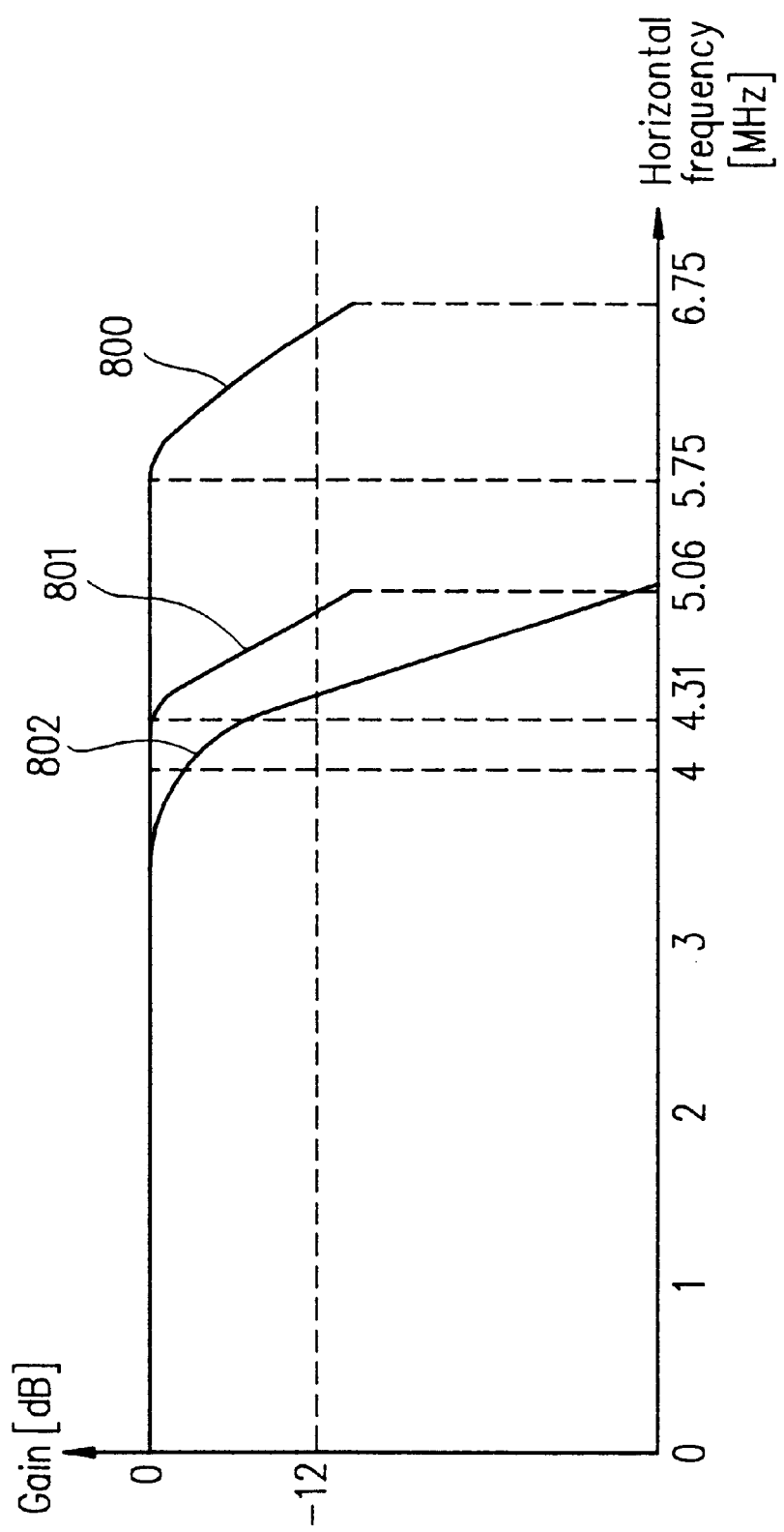
FIG. 8 is a graph showing the characteristics of the luminance signal when the luminance signal is input to a blocker.

FIG. 8 is a graph showing the frequency characteristics of the luminance signal after the A/D conversion and those of the luminance signal after the digital filtering. In FIG. 8, the curve 800 indicates the characteristics of the luminance signal sampled at a frequency of 13.5 MHz in the standard recording mode; the curve 801 indicates the characteristics of the luminance signal sampled at a frequency of 10.125 MHz in the long-time recording mode; and the curve 802 indicates preferable characteristics of the luminance signal in the long-time recording mode to be obtained by restraining the characteristics indicated by the curve 801 in the high-pass band by using the digital filter 700.

The gain of the luminance signal in the standard recording mode is defined to be 0 dB at a frequency of 5.75 MHz or less, and −12 dB or less at a frequency of 6.75 MHz according to the standard REC601 (as indicated by the curve 800). Since the sampling frequency for the luminance signal in the long-time recording mode becomes three-quarters of the frequency in the standard recording mode, the gain of the luminance signal in the long-time recording mode becomes 0 dB at a frequency of 4.31 MHz or less and −12 dB or less at a frequency of 5.06 MHz according to the standard REC601 (as indicated by the curve 801).

However, as described in the first example, the compression of the data in the long-time recording mode is performed at a compression rate which is four-thirds of the compression rate in the standard recording mode. Therefore, unless the data is processed in an appropriate manner, a sufficient amount of codes cannot be assigned in the low to middle frequency regions considerably affecting the visual quality of the video unlike the standard recording mode, so that the quality of the video is degraded. In order to prevent such a degradation, the frequency components in the high-pass band of 5 MHz or more is sufficiently attenuated by using the digital filter 700, and the frequency components in the band of 4 to 5 MHz is also attenuated to a certain degree in order to facilitate the design of the filter 700. As a result, the codes in such an amount as not to considerably degrade the resolution can be assigned to the low to middle frequency regions. The specific characteristics of the digital filter 700 can be arbitrarily selected while examining the quality of the processed video.

As described above, according to the method of this example, by sufficiently attenuating the frequency components of the luminance signal in the high-pass band in the long-time recording mode, it is possible to prevent a considerable degradation of the quality of the video during a coding processing.

EXAMPLE 4

Figure 9:
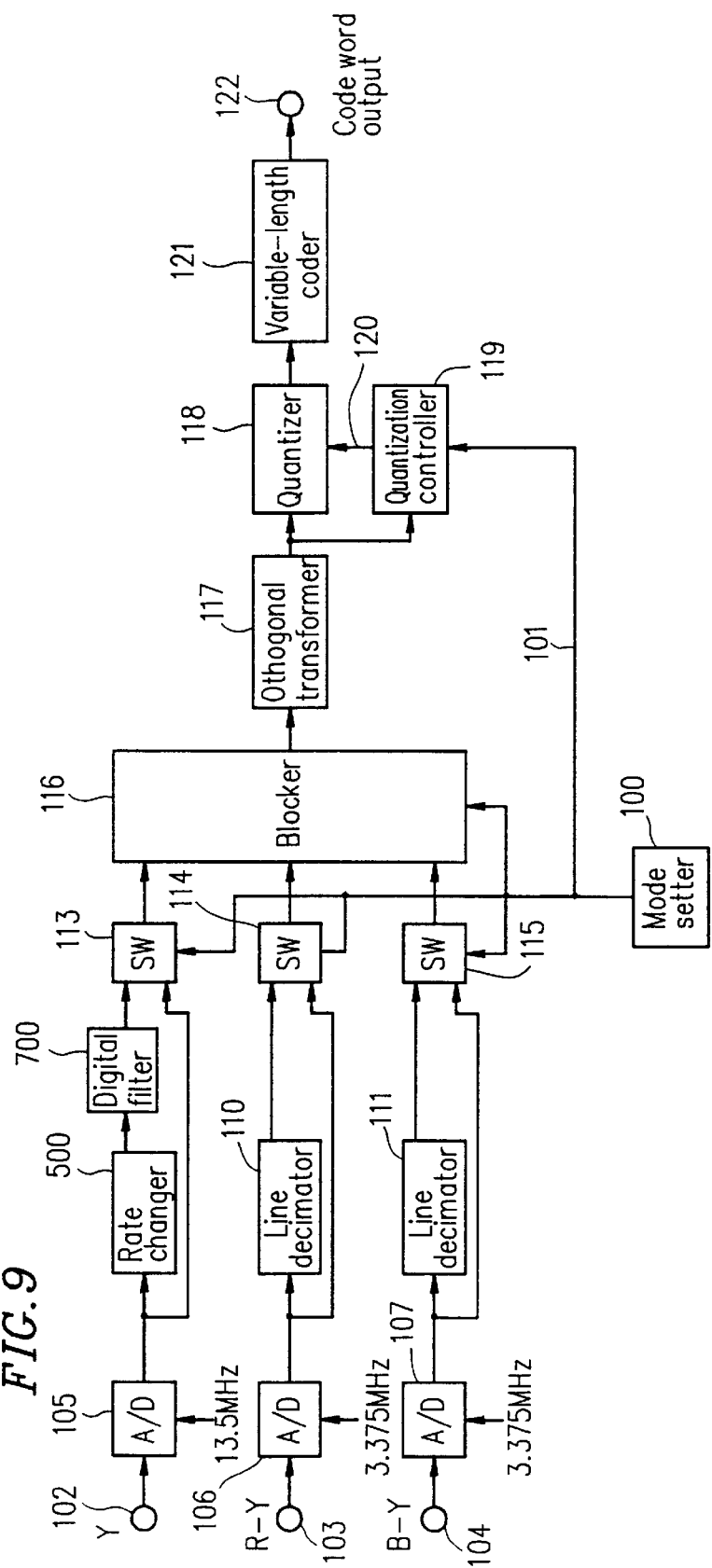
FIG. 9 is a block diagram showing a configuration for a digital signal recording apparatus according to a fourth preferred embodiment of the present invention.

FIG. 9 is a block diagram showing a configuration for a digital signal recording apparatus according to a fourth example of the present invention. The digital signal recording apparatus of this example additionally includes a digital filter 700 of the third example immediately adjacent to the rate changer 500 of the second example. In this example, the clock of the luminance signal can be commonly used for the A/D conversion in both modes; the data can be satisfactorily processed in the long-time recording mode by using a digital processing portion only; and the same effects as those described in the third example can be attained by using the digital filter 700. In this example, the digital filter 700 is operated after the rate is changed. However, in general, the rate change is frequently realized by using a digital filter. Accordingly, the rate changer 500 can be integrally formed with the digital filter 700.

EXAMPLE 5

Figure 10:
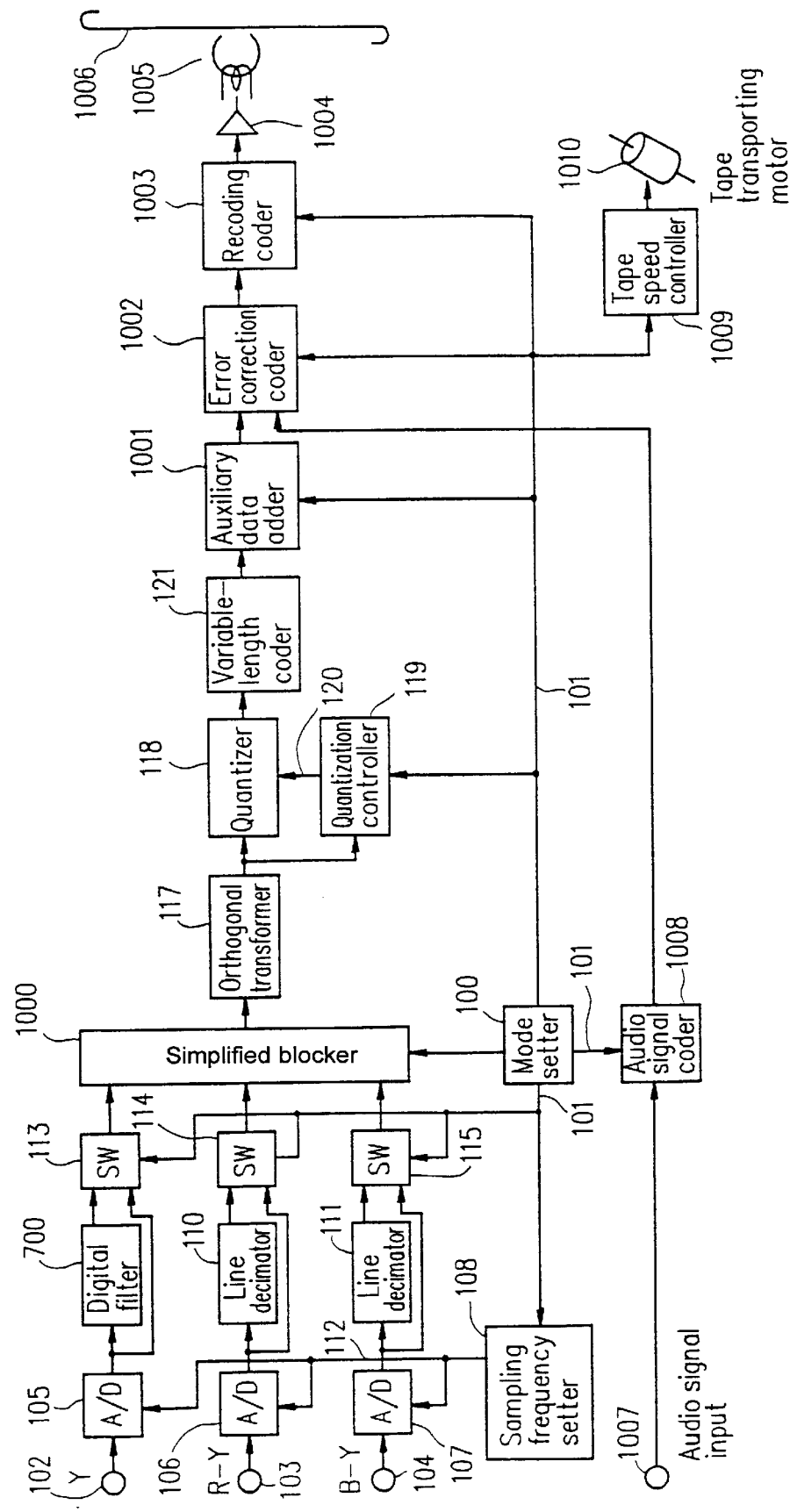
FIG. 10 is a block diagram showing a configuration for a digital signal recording apparatus according to a fifth preferred embodiment of the present invention.

FIG. 10 is a block diagram showing a configuration for a digital signal recording apparatus according to a fifth example of the present invention. In FIG. 10, the reference numerals denote as follows: 1000 is a simplified blocker; 1001 is an auxiliary data adder; 1002 is an error correction coder; 1003 is a recording coder; 1004 is a recording amplifier; 1005 is a recording head; 1006 is a magnetic tape; 1007 is an audio signal input terminal; 1008 is an audio signal coder; 1009 is a tape speed controller; and 1010 is a tape transporting motor.

Hereinafter, the operation of the digital signal recording apparatus of the fifth example will be described. It is noted that the operations of the respective components denoted by 110 to 115 and 117 to 121 are the same as those of the components denoted by the same reference numerals in the third example. In this example, the digital filter 700 described in the third example is used for processing the luminance signal. Alternatively, the delay circuit 112 described in the first example can be used instead.

Figure 11:
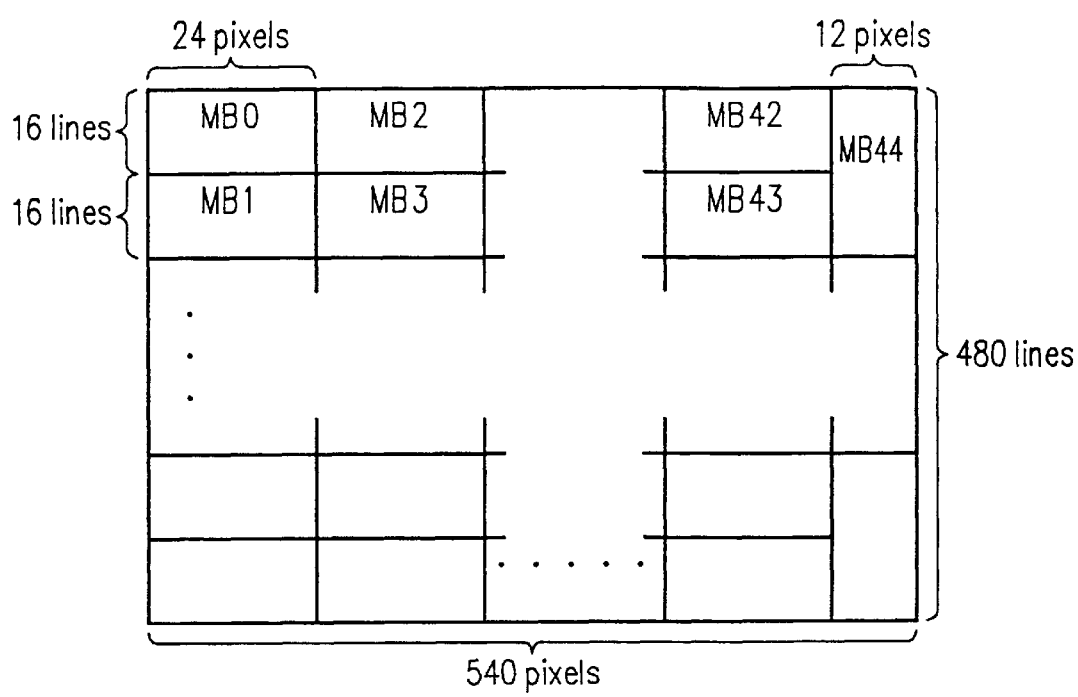
FIG. 11 is a schematic diagram showing an arrangement of the macro blocks in the long-time recording mode.

FIG. 11 shows an exemplary arrangement of a plurality of macro blocks in the long-time recording mode. In this example, the luminance signal per frame consists of 540 horizontal pixels×480 vertical lines while one macro block consists of 24 horizontal pixels×16 vertical lines. Accordingly, one frame is divided into 675 macro blocks, i.e., 22.5 horizontal macro blocks×30 vertical macro blocks. In this case the number of the horizontal pixels per frame is not N times as large as the number of the horizontal pixels per macro block, so that the macro block (MB44) at the right end has an elongate configuration in the vertical direction.

In the case where such elongate macro blocks as those shown in FIG. 11 exist, a conventional method requires a larger number of line memories as compared with the case of processing ordinary macro blocks.

However, according to the method of this example, it is possible to simplify the blocking process by using a simplified blocker 1000, and prevent the number of the circuits to be used.

Figure 12:
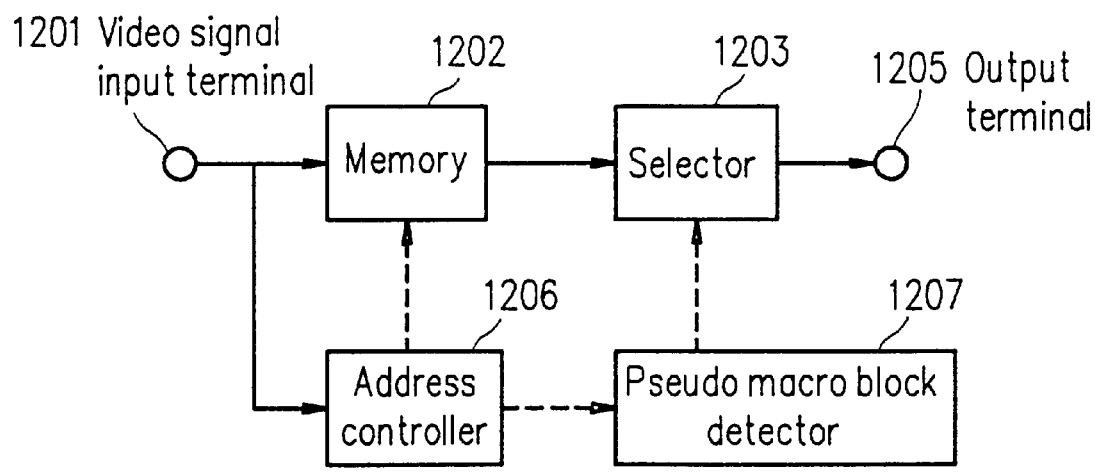
FIG. 12 is a block diagram showing a configuration for a simplified blocker.

FIG. 12 is a block diagram showing a detailed configuration for the simplified blocker 1000 of this example. As shown in FIG. 12, the simplified blocker 1000 includes: a memory 1202; a selector 1203; an address controller 1206; and a pseudo macro block detector 1207.

As shown in FIG. 12, three kinds of digital video signals Y, R-Y and B-Y input from a video signal input terminal 1201 are input to the memory 1202 and the address controller 1206. The address controller 1206 detects an effective pixel range based on the horizontal and vertical synchronization signals of the input video signals, thereby controlling the address so that the video signals input to the memory on the respective horizontal lines are read out in the order of the macro blocks. As a result, the video signals are output from the memory 1202 on a macro block basis. The macro blocks included in the input video signals output from the memory 1202 are herein referred to as "input macro blocks".

When the address of the macro block at the right end in the horizontal direction within one frame, i.e., the region of the twelve pixels at the right end of FIG. 11, is output from the address controller 1206, the pseudo macro block detector 1207 outputs a pseudo macro block detection signal to the selector 1203. When the pseudo macro block detection signal is not input to the selector 1203, the selector 1203 outputs the input macro block via an output terminal 1205. On the other hand, when the pseudo macro block detection signal is input to the selector 1203, the selector 1203 outputs a predetermined value via the output terminal 1205. The macro block having the predetermined value output from the selector 1203 when the pseudo macro block is detected will be called a pseudo macro block herein.

In this example, the macro block with a particular shape at the right end in FIG. 11 is replaced by the pseudo macro block, so that it is not necessary to read the input video signal from the memory 1202 during the period. Therefore, no address generator and no memory region for storing the video signal are required for the macro block with this particular shape. As a result, even when the number of the horizontal or vertical effective pixels in one frame is not N times as large as the number of the horizontal or vertical effective pixels in one macro block, there is no need for providing an address generator or increasing the capacity of the memory.

Figure 13:
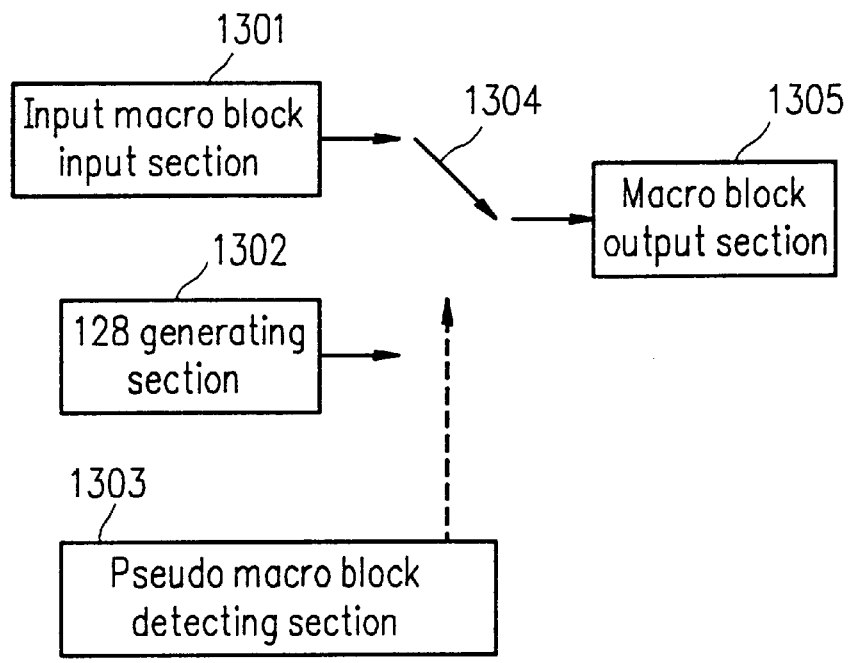
FIG. 13 is a block diagram showing a configuration for a selector.

Next, referring to FIG. 13, an exemplary pseudo macro blocker (or the selector 1203 shown in FIG. 12) will be described. In FIG. 13, the reference numerals denote as follows: 1301 is an input macro block input section; 1302 is a 128 generating section; 1303 is a pseudo macro block detecting section; 1304 is a switch; and 1305 is a macro block output section.

When the pseudo macro block detection signal is not input from the pseudo macro block detecting section 1303, the switch 1304 shown in FIG. 13 outputs the input macro block input from the input macro block input section 1301 to the macro block output section 1305. On the other hand, when the pseudo macro block detection signal is input from the pseudo macro block detecting section 1303, the switch 1304 outputs a value of 128 generated by the 128 generating section 1302 to the macro block output section 1305. As a result, when the pseudo macro block is detected, the value of 128 is always output as the pixel value of the pseudo macro block.

By using such a configuration, all the pixel values within the pseudo macro block are fixed at 128, so that the video coding considerably reduces the amount of the data. Therefore, it is possible to assign a code-word data in other input macro blocks to a part of the code-word region to which the pseudo macro block is assigned, thereby reducing the compression rate of the input macro block and improving the quality of the reproduced video.

Consequently, in this example, by setting the pixel value of the pseudo macro block to be constant, it is possible to improve the quality of the reproduced video in the input macro block.

Figure 14:
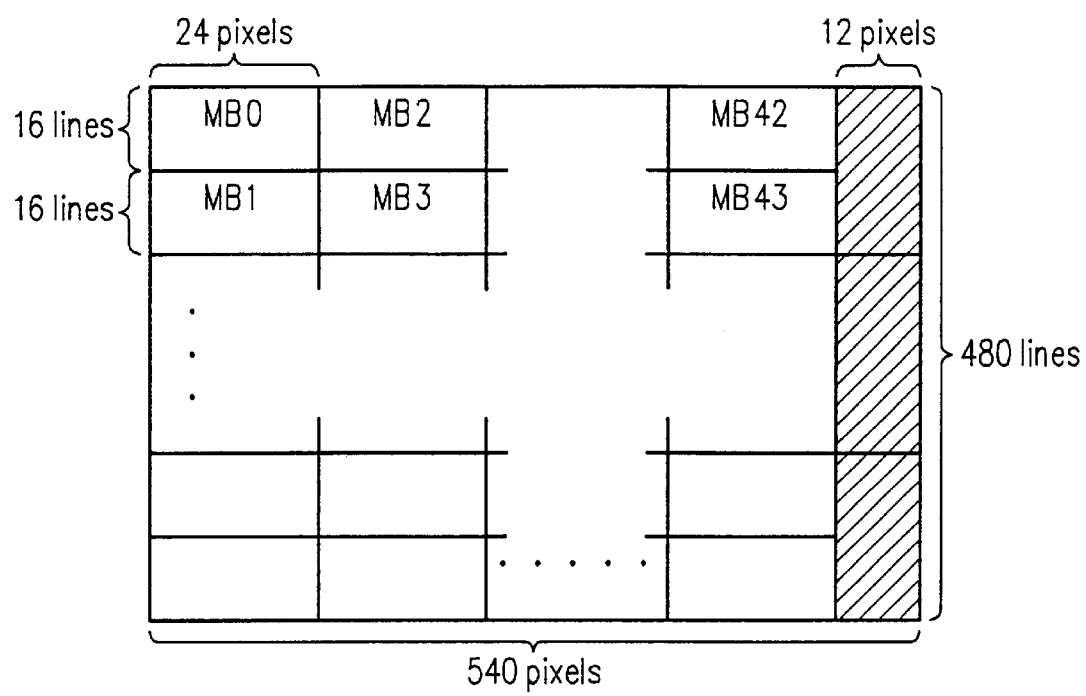
FIG. 14 is a schematic diagram showing a configuration for a screen on which the video signal recorded in the long-time recording mode is reproduced.

FIG. 14 shows an exemplary configuration for the screen when such a pseudo macro block is used. The region for the pseudo macro block is indicated by the hatching at the right end in FIG. 14. In FIG. 14, all the data in the pseudo macro block region is reproduced at a pixel value of 128, so that the region is recognized as a horizontal blanking region and causes no visual disturbance.

The technique using a pseudo macro block of this example is applicable to any arbitrary macro block structure or frame structure. The pixel value in the pseudo macro block is not limited to 128 employed in this example, but an arbitrary value can be selected. The pixel values within the pseudo macro block can be varied in the respective small blocks.

In a reproducing apparatus to which the simplified blocker 1000 is applied, the pixel value in the pseudo macro block region can be replaced by an arbitrary value and then output during the reproducing operation, in the same manner as a coder.

Figure 15:
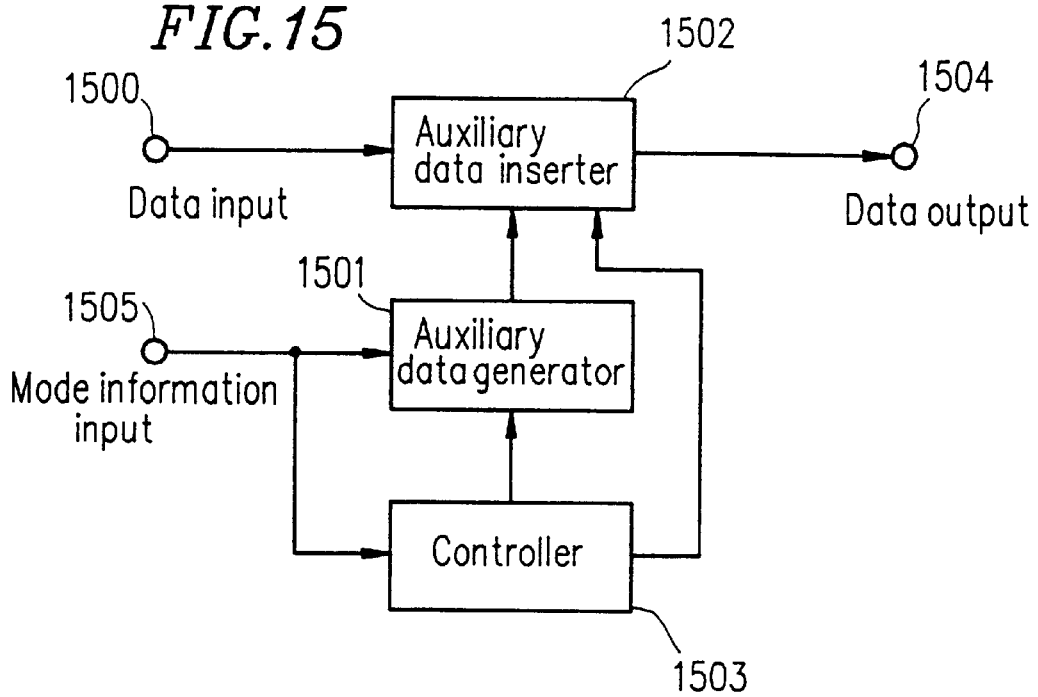
FIG. 15 is a block diagram showing a configuration for an auxiliary data adder.

FIG. 15 is a block diagram showing a detailed configuration for the auxiliary data adder 1001 of this example. As shown in FIG. 15, the auxiliary data adder 1001 includes: an auxiliary data generator 1501; an auxiliary data inserter 1502; and a controller 1503. The digital data is input to the auxiliary data inserter 1502 via an input terminal 1500, and a signal to which the auxiliary data is inserted is output from the auxiliary data inserter 1502 via an output terminal 1504. The mode information 101 is input to the auxiliary data generator 1501 and the controller 1503 via a mode information input terminal 1505.

In this example, the video data is assumed to be input via the input terminal 1500 and the amount of the information in the long-time recording mode is assumed to be one half of the amount of the information in the standard recording mode. In this case, the information is recorded by using ten tracks per frame in the standard recording mode and five tracks per frame in the long-time recording mode, for example.

First, a case where the recording operation is performed in the standard recording mode will be described. An auxiliary data is generated by the auxiliary data generator 1501. The auxiliary data is inserted into the coded video data by the auxiliary data inserter 1502. The position of the video data into which the auxiliary data is inserted is controlled by the controller 1503.

Figure 16A:
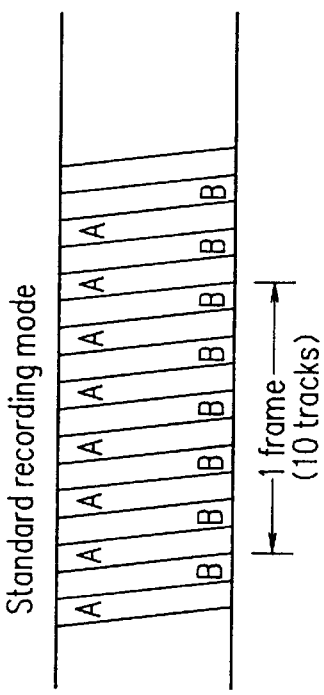
FIG. 16A is a schematic diagram showing a track pattern in the case where the data is recorded in the standard recording mode.

FIG. 16A schematically shows the position on the recording track into which the auxiliary data is inserted. As shown in FIG. 16A, the auxiliary data is repeatedly and periodically inserted into the positions A and B from the head track of the frame. More specifically, the auxiliary data is inserted in the order of A→B→A→B→. . .

Next, a case where the recording operation is continuously performed on a track in the long-time recording mode immediately after the recording operation on the same track in the standard recording mode is finished. In this case, when the video data for the long-time recording mode is input, the mode information 101 input from the mode information input terminal 1505 is switched from "0" (for the standard recording mode) into "1" (for the long-time recording mode). Thereafter, the auxiliary data for the long-time recording mode generated by the auxiliary data generator 1501 is inserted by the auxiliary data inserter 1502 with the insertion position controlled by the controller 1503.

Figure 16B:
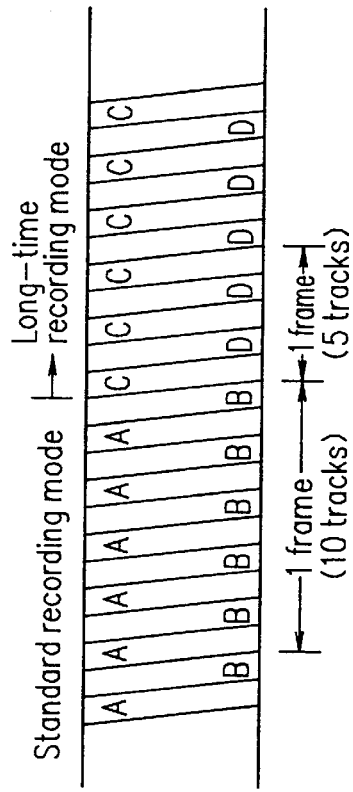
FIG. 16B is a schematic diagram showing a track pattern in the case where the data is recorded in the long-time recording mode immediately after the data has been recorded in the standard recording mode.

In the same way as in the standard recording mode, the auxiliary data is periodically inserted into the different positions from the head track of the frame. In the long-time recording mode, since the number of the recording tracks per frame is 2n+1 (n=1, 2, . . . ; in this example, n=2), the controller 1503 controls the insertion at a period of two frames. More specifically, as shown in FIG. 16B, the auxiliary data is inserted in the order of C→D→C→D→C in the recording start frame and in the order of D→C→D→C→D in the next frame. As a result, the period of the positions into which the auxiliary data is inserted is the same as that in the standard recording mode.

Figure 16C:
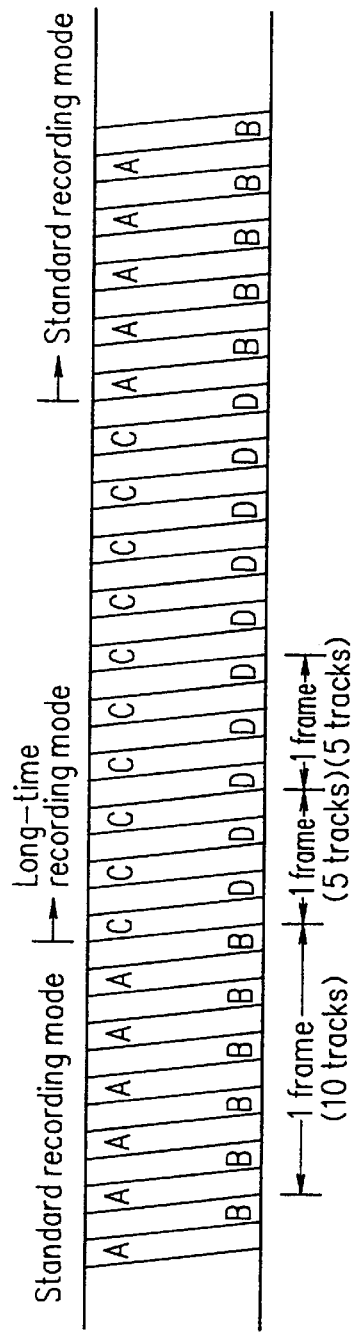
FIG. 16C is a schematic diagram showing a track pattern in the case where the data is recorded in the standard recording mode immediately after the data has been recorded in the long-time recording mode.

On the other hand, in the case where the recording operation is continuously performed on a track in the standard recording mode immediately after the recording operation on the same track in the long-time recording mode is finished, the start position of the standard recording is controlled by the controller 1503 so that the standard recording is started immediately after a frame in which the last insertion position of the auxiliary data is the position C by using a number m of frames (m=2, 4, 6, . . . ; in this example m=2) for the long-time recording mode as an edition unit. The recording pattern obtained in this way is shown in FIG. 16C. As shown in FIG. 16C, the period of the insertion positions of the auxiliary data is maintained in both of the portions where the video data is recorded in the standard recording mode and in the portions where the video data is recorded in the long-time recording mode.

As described above, according to the method of this example, by controlling the insertion positions of the auxiliary data and the timing for switching the recording modes, it is possible to maintain the period of the insertion positions of the auxiliary data even when the video data is recorded on one and the same tape-shaped recording medium in both modes. As a result, the auxiliary data can be detected during the reproduction operation by commonly using a detector and detection timings for the standard recording mode, irrespective of whether the video data is recorded in the standard recording mode or in the long-time recording mode.

In this example, the video data is recorded by using ten tracks per frame in the standard recording mode and five tracks in the long-time recording mode. However, the number of the tracks to be used is not limited thereto. Since the amount of information to be recorded in the long-time recording mode is 1/m (m=2, 4, 6, . . . ) as small as the amount of the information to be recorded in the standard recording mode, the number of the recording tracks in the long-time recording mode can be generally expressed by 2n+1, while the number of the recording tracks in the standard recording mode can be generally expressed by m×(2n+1). It is obvious that the same effects can be generally attained irrespective of the number of the recording tracks to be used.

In this example, the data to be recorded is assumed to be a video data. However, it is obvious that the same effects can be attained if other kinds of data such as an audio data is recorded. A video signal, an audio signal or the like can be compressed by any arbitrary method such as a DCT, a DPCM or the like.

The detailed contents of a track have not specifically been mentioned in the above description. A track may have any arbitrary contents. The auxiliary data principally consists of the information required for reproducing an audio data, a video data or the like. However, the auxiliary may have any arbitrary content.

An appropriate error correction code is added by the error correction coder 1002 to the data to which the auxiliary data has been added in accordance with the mode information 101.

Figure 17:
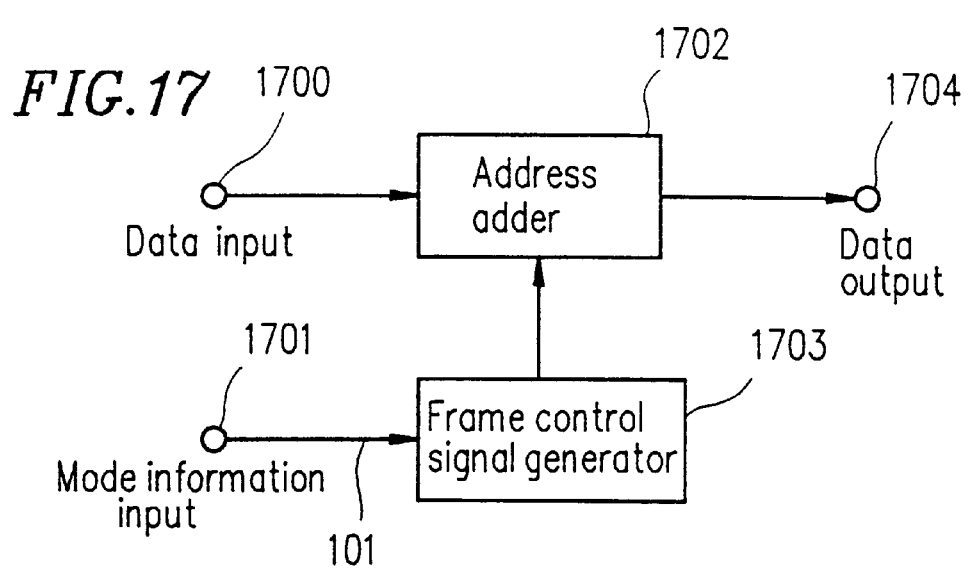
FIG. 17 is a schematic diagram showing a configuration for a recording coder.

FIG. 17 is a block diagram showing a detailed configuration for the recording coder 1003. In FIG. 17, the reference numerals denote as follows: 1700 is a data input terminal; 1701 is a mode information input terminal; 1702 is an address adder; 1703 is a frame control signal generator; and 1704 is a recording data output terminal. Hereinafter, the operation of the recording coder 1003 of this example will be described. In this example, it is assumed that a video data is input, and that a one-frame control is performed in the standard recording mode while a two-frame control is performed in the long-time recording mode. However, the control can be performed on an n-frame basis in the same way.

The frame control signal generator 1703 generates a one-frame control signal when the mode information 101 is "0" in order to synchronize the frames with each other on a one-frame basis. On the other hand, when the mode information 101 is "1", the frame control signal generator 1703 generates a two-frame control signal in order to synchronize the frames with each other on a two-frame basis. In the case where the input video signal is a composite signal, the two-frame control signal can be synchronized with the color frame period thereof.

Referring back to FIG. 10, the processing of an audio data will be described. When the audio signal input from an audio signal input terminal 1007 is an analog signal, the audio signal is A/D converted and then processed by an audio signal coder 1008. Needless to say, when the audio signal input from the audio signal input terminal 1007 is a digital signal, there is no need for performing the A/D conversion. The audio signal is blocked by performing predetermined audio signal processings such as a filtering, a rearrangement, a compression and the like if necessary in accordance with the mode information 101, so as to be output as an audio data. Thereafter, the blocked data is error correction coded by the error correction coder 1002; an address for recording is added to the data by the recording coder 1003; and the data is amplified by the recording amplifier 1004 and then recorded on the magnetic tape 1006 by the recording head 1005.

The tape speed controller 1009 determines a tape transporting speed suitable for the respective modes in accordance with the mode information 101 and controls the tape transporting motor 1010.

In this case, the audio data is recorded on the respective tracks in the same recording pattern as that described in the conventional example. However, since the tape transporting speed is different, the pattern to be actually formed on the tape possibly has a slightly different track angle.

Figure 18A:
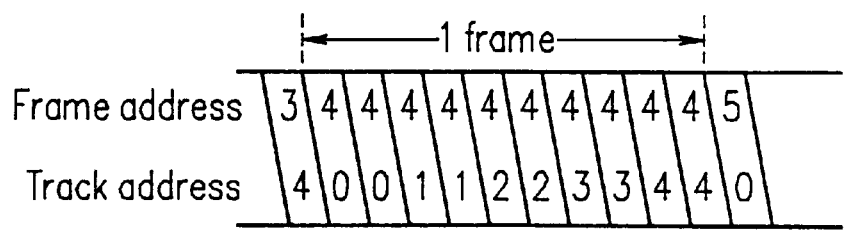
FIG. 18A is a schematic diagram showing a preferred arrangement of the addresses in the standard recording mode.
Figure 18B:
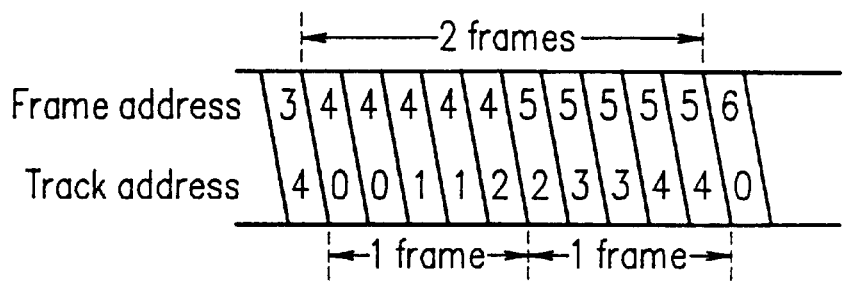
FIG. 18B is a schematic diagram showing a preferred arrangement of the addresses in the long-time recording mode.
Figure 19:
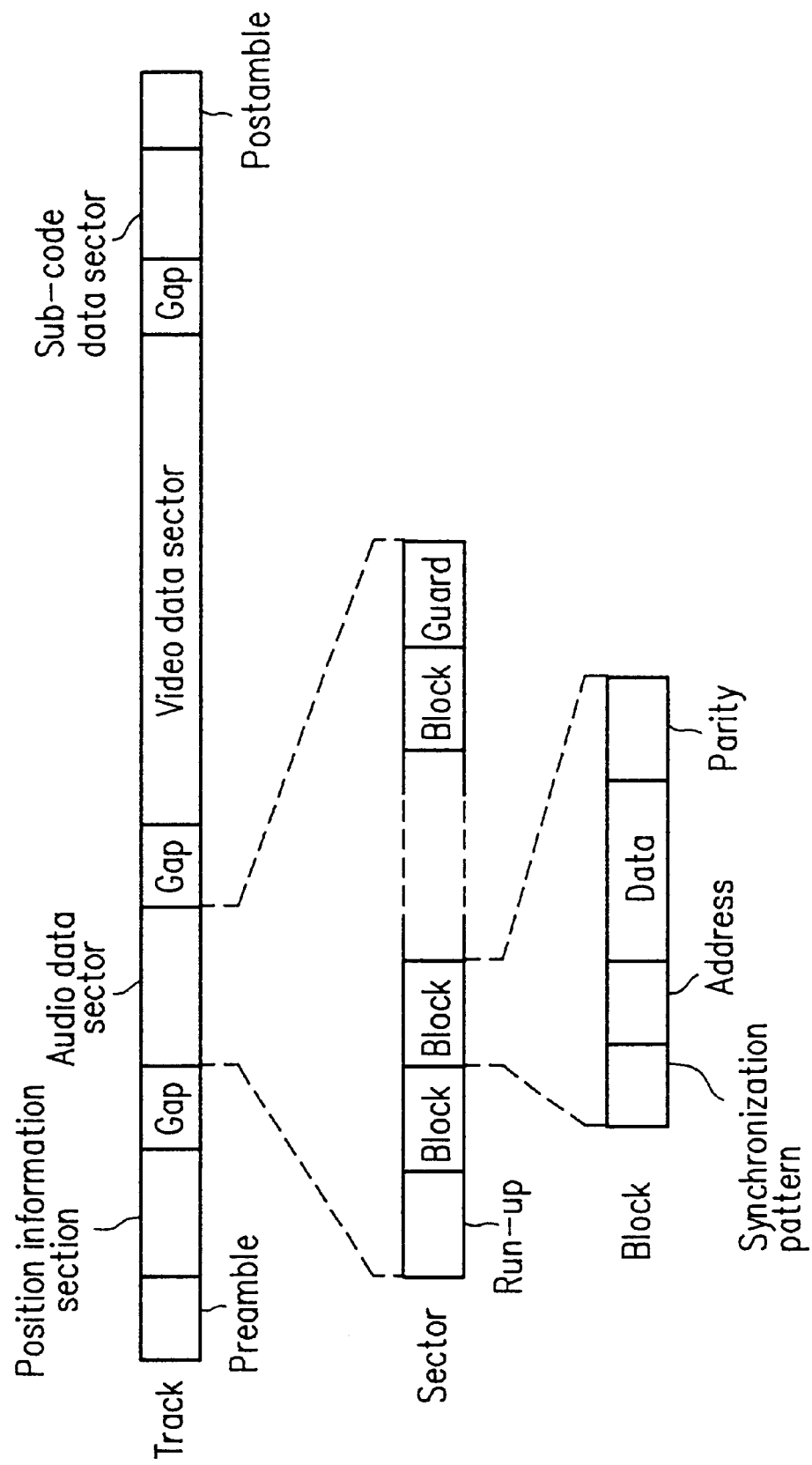
FIG. 19 is a schematic diagram showing a recording pattern for a conventional recording apparatus.

The sub-code data and the auxiliary data which are assembled on a one-field basis or on a one-frame basis can be assembled on a two-frame basis in accordance with the two-frame control signal. In order to use the arrangement of these data in the same way as the data recorded by a conventional recording apparatus, an address is composed of a frame address for identifying a frame, a track address provided at a period of two frames and a block address provided at a period of one track. For example, in a recording apparatus in which one frame is composed of ten tracks, the frame addresses and the track addresses can be arranged as shown in FIGS. 18A and 18B. In FIGS. 18A and 18B, the track address is begun with 0, and the same value is assigned to two adjacent tracks having different azimuths. The same result is obtained irrespective of how the values are assigned. That is to say, the assignment can be begun with any other value; the value can be changed in every track; and the value can increase or decrease. In this example, the recording pattern for a track shown in FIG. 19 is employed. However, the same result can be obtained in any form such as the number of the sectors. According to the present invention, an address is added after the error correction coding is performed. However, if the recording is performed in the order of the addition of an address, the error correction coding with respect to the address and the data, and generation of a parity, the same effects can be attained.

In the case of recording a currently used TV signal having a system of 525 lines and 60 fields, the n frames of the TV signal can be recorded on ten tracks, while in the case of recording a currently used TV signal having a system of 625 lines and 50 fields, the n frames of the TV signal can be recorded on twelve tracks. In such a case, n can be 1 in the standard recording mode and n can be 2 in the long-time recording mode.

As described above, according to the method of this example, by compressing a video signal at a rate n times as high as a conventional rate and using a track address for designating a track at a period of n frames, the recording can be performed for a time longer than a conventional time. In addition, by commonly using a recording apparatus with the same configuration in both the standard recording mode and the long-time recording mode, almost no circuits are required to be additionally provided except for the circuits necessary for a high compression. Furthermore, any method can be used for compressing a video signal and an audio signal.

EXAMPLE 6

Figure 20:
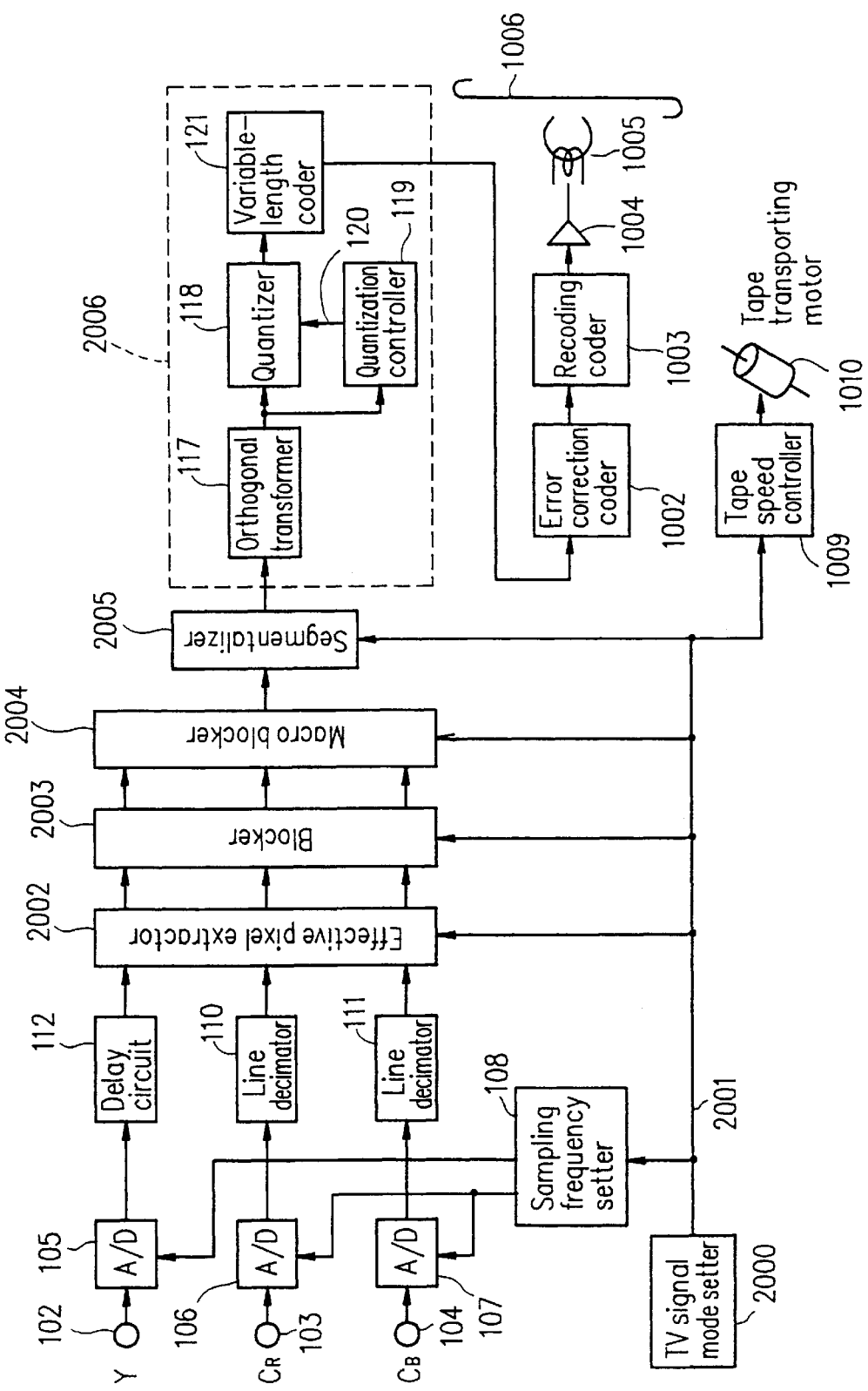
FIG. 20 is a block diagram showing a configuration for a digital signal recording apparatus according to a sixth preferred embodiment of the present invention.

FIG. 20 is a block diagram showing a configuration for a digital video signal recording apparatus according to a sixth example of the present invention. In FIG. 20, the reference numerals denote as follows: 2000 is a TV signal mode setter for setting the recording mode of this apparatus to be any of a HDTV signal recording mode, a wide TV signal recording mode and a standard TV signal recording mode; 2001 is TV signal mode information set by the TV signal mode setter 2000; 2002 is an effective pixel extractor for extracting effective pixels from the pixel data of the input video signal; 2003 is a blocker for composing a block consisting of eight horizontal pixels×eight vertical lines from the input signal so as to output a signal on a block basis; 2004 is a macro blocker for composing a macro block from the blocks of the luminance signal, one block of one of the color difference signals included in substantially the same region on the screen, and one block of the other color difference signal; 2005 is a segmentalizer for composing a segment by assembling five macro blocks from five different positions on the screen which are distant from each other; 2006 is a coder for coding the video signal so that the amount of the codes becomes an amount predetermined on a segment basis or less. The coder 2006 includes: an orthogonal transformer 117; a quantizer 118; a quantization controller 119 for determining the quantization steps in the quantizer 118 so that the data amount after a high-efficiency coding becomes a predetermined amount or less; and a variable-length coder 121. Hereinafter, the operation of the digital signal recording apparatus of this example will be described with reference to FIG. 20.

The TV signal mode setter 2000 sets the recording mode of this apparatus to be any of the HDTV signal recording mode, the wide TV signal recording mode and the standard TV signal recording mode, thereby outputting the control signals corresponding to the respective modes.

The luminance signal Y, and two kinds of color difference signals $C_R$ and $C_B$ input from the input terminals 102, 103 and 104, respectively, are converted into digital signals by the A/D converters 105, 106 and 107. The sampling frequency setter 108 sets the sampling frequencies of the A/D converters 105, 106 and 107 based on the TV signal mode information 2001 output from the TV signal mode setter 2000.

In the HDTV signal recording mode, the sampling frequency of the AD converter 105 is set to be 40.5 MHz, and the sampling frequencies of the A/D converters 106 and 107 a reset to be 13.5 MHz. In the wide TV signal recording mode, the sampling frequency of the A/D converter 105 is set to be 20.25 MHz, and the sampling frequencies of the A/D converters 106 and 107 are set to be 6.75 MHz. In the standard TV signal recording mode, the sampling frequency of the A/D converter 105 is set to be 10.125 MHz, and the sampling frequencies of the A/D converters 106 and 107 are set to be 3.375 MHz.

The digitally converted luminance signal output from the A/D converter 105 is input to the effective pixel extractor 2002. The vertical pass-bands of the two digitally converted color difference signals output from the A/D converters 106 and 107 are limited to one half by the line decimators 110 and 111, and then the lines of the two color difference signals are decimated on a line basis, so as to be input to the effective pixel extractor 2002.

The effective pixel extractor 2002 extracts the effective pixel data to be actually coded and recorded from the input pixel data. In this example, the effective pixel data is extracted based on the mode information output from the mode setter 100 as follows. In the HDTV signal recording mode, the pixel data corresponding to 1080 horizontal pixels×960 vertical lines is extracted from the luminance signal and the pixel data corresponding to 360 horizontal pixels×480 vertical lines is extracted from the color difference signals. In the wide TV signal recording mode, the pixel data corresponding to 1080 horizontal pixels×480 vertical lines is extracted from the luminance signal and the pixel data corresponding to 360 horizontal pixels×240 vertical lines is extracted from the color difference signals. In the standard TV signal recording mode, the pixel data corresponding to 540 horizontal pixels×480 vertical lines is extracted from the luminance signal and the pixel data corresponding to 180 horizontal pixels×240 vertical lines is extracted from the color difference signals.

The blocker 2003 composes blocks, each of which consists of 64 pixels, i.e., eight horizontal pixels×eight vertical lines, from the pixel data extracted by the effective pixel extractor 2002 from each of the luminance signal and the color difference signals, thereby outputting a signal on a block basis.

The macro blocker 2004 composes and outputs one macro block from the blocks of the luminance signal, one block of one of the color difference signals included in substantially the same area on the screen, and one block of the other color difference signal. In this example, a macro block is composed of eight DCT blocks, i.e., the six blocks of the luminance signal and two color difference signal blocks as shown in FIG. 4.

Figure 21:
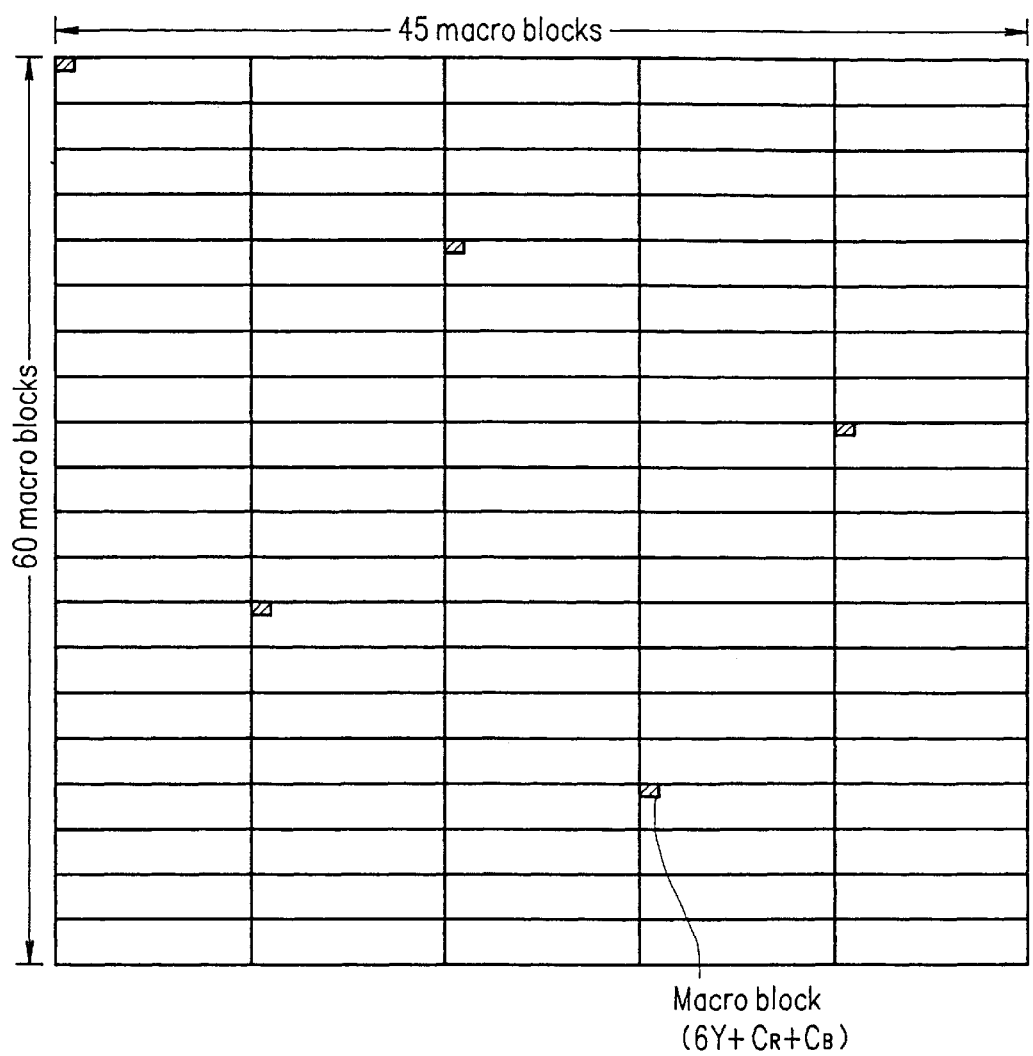
FIG. 21 is a schematic diagram showing a positional relationship between the video segment and the macro blocks in recording the HDTV signal by using the recording apparatus of the present invention.
Figure 22:
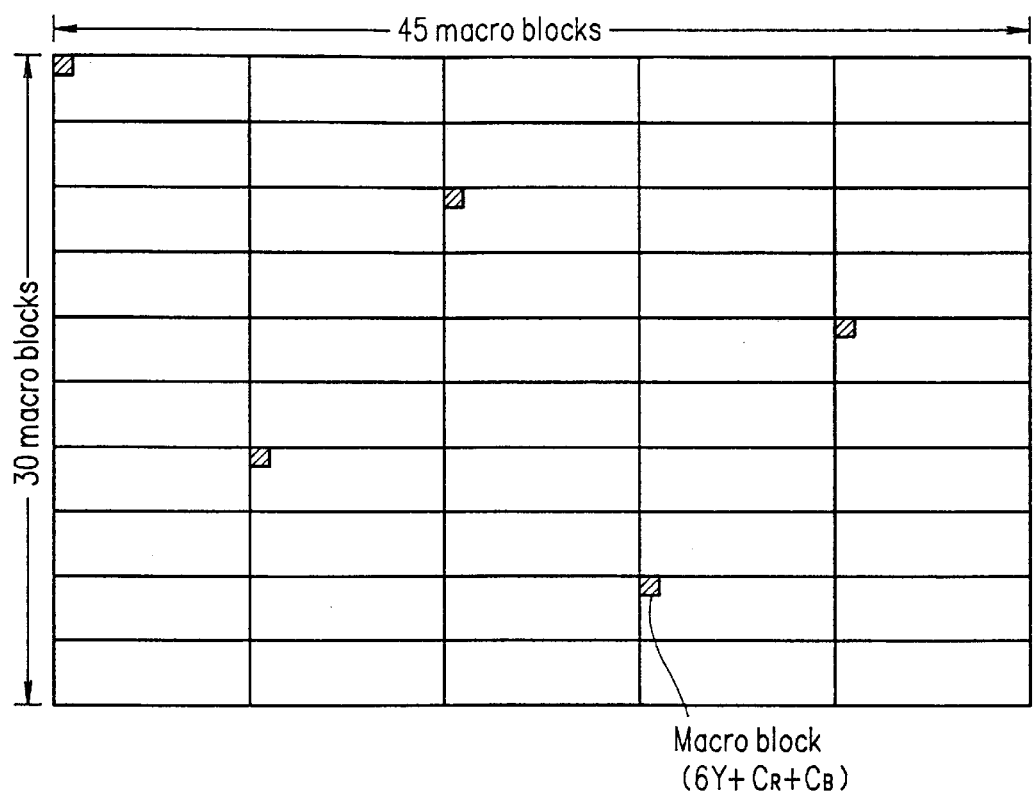
FIG. 22 is a schematic diagram showing a positional relationship between the video segment and the macro blocks in recording the wide TV signal by using the recording apparatus of the present invention.

The segmentalizer 2005 composes one segment by assembling a plurality of macro blocks from the positions on the screen which are distant from each other in order to average as much as possible the amount of the codes to be generated in one segment functioning as a coding unit. In this example, one segment is composed of five macro blocks. The positional relationships among the macro blocks composing the segment in the HDTV signal recording mode, the wide TV signal recording mode and the standard TV signal recording mode are shown in FIGS. 21, 22 and 3, respectively.

The segmentalized video data is coded so that the amount of the codes thereof does not exceed the code amount predetermined by the coder 2006 on the segment basis. The numbers of the segments in one frame for the respective recording modes are as follows: in the HDTV signal recording mode, 45 horizontal macro blocks×60 vertical macro blocks/5=540 segments as shown in FIG. 21; in the wide TV signal recording mode, 45 horizontal macro blocks×30 vertical macro blocks/5=270 segments as shown in FIG. 22; and in the standard TV signal recording mode, 22.5 horizontal macro blocks×30 vertical macro blocks/5=135 segments as shown in FIG. 3. When the numbers of the recording tracks per frame to be formed on the magnetic tape 1006 in the respective recording modes are assumed to be 20, 10 and 5, the number of the segments per track becomes 27 in all the recording modes. When the amount of the codes to be recorded on one track is assumed to be A bits, the amount of the codes usable in one segment is equal in all the recording modes, i.e., A/27 bits.

The data high-efficiency coded in the above-described manner is recorded on the magnetic tape 1006 by forming recording tracks thereon by a helical scanning after the data is supplied through the same path as in the fifth example. The data is recorded on 20 tracks per frame in the HDTV signal recording mode; on 10 tracks per frame in the wide TV signal recording mode; and on 5 tracks per frame in the standard TV signal recording mode.

The tape speed controller 1009 controls the rotation speed of the tape transporting motor 1010 in accordance with the TV signal mode information 2001 output from the TV signal mode setter 2000, thereby varying the tape transporting speed of the magnetic tape 1006 so as to equalize the width of the recording tracks in the respective recording modes.

As is apparent from the foregoing description, in the case where the digital video signal recording apparatus of this example is applied to a digital VTR for recording a HDTV signal, a wide TV signal and a standard TV signal, by setting the ratio of the sampling frequencies, the effective sampling numbers and the numbers of the recording tracks per frame for the respective TV signals to be 4:2:1, the macro blocks for the respective TV signals can be composed in the same way; and by using the same compression rate for the respective TV signals, it is possible to commonly use a macro blocking section and a coding section which have conventionally been difficult to commonly use, so that it becomes possible to commonly use a considerable portion of the circuit for constituting a digital VTR for recording a HDTV signal, a wide TV signal and a standard TV signal.

It is noted that the sampling frequencies, the effective sampling numbers and the numbers of the recording tracks per frame for the respective TV signals described in the foregoing examples are not limited to those shown specifically therein so long as the proportional relationship thereof in the respective recording modes satisfies the predetermined ratio.

In the foregoing examples, the sampling frequencies are varied in accordance with the respective recording modes. However, the sampling frequencies of the A/D converters 105, 106 and 107 are fixed at a minimum common multiple of the sampling frequencies corresponding to the respective recording modes, i.e., the sampling frequency for the luminance signal is fixed at 40.5 MHz in this example. However, the sampling frequency can be changed into 20.5 MHz and 10.125 MHz by performing a digital filtering processing and a pixel decimating processing in accordance with the respective recording modes.

In this example, the color difference signals are subjected to a line-sequential processing. However, even when the line-sequential processing is not performed, the same effects can be attained according to the present invention.

One segment is composed by the segmentalizer 2005 by assembling five macro blocks in this example. However, one segment can compose of any other number of macro blocks so long as the segment can be composed in the same way in the respective recording modes.

In the above description, the coding performed by the coder 2006 is an orthogonal transform. However, the same effects can be attained by performing any other coding processing according to the present invention.

In this example, the configuration of a scanner such as a disposition of the recording head 1005 on a rotational cylinder is not particularly mentioned. Any configuration can be employed so long as a ratio of the numbers of the recording tracks formed on the magnetic tape 1006 corresponds to the respective recording modes.

In this example, three kinds of video signals are recorded in the three kinds of recording modes, i.e., the HDTV signal recording mode, the 16:9 wide TV signal recording mode and the standard TV signal recording mode. However, the same effects can be attained by regarding the wide TV signal recording mode as a standard TV signal recording mode and the standard TV signal recording mode as a standard TV signal long-time recording mode.

In addition, the same effects can be attained by using two kinds of video recording signals, i.e., the HDTV signal and the standard TV signal.

It is noted that the data of the video signal recorded by the digital video signal recording apparatus of this invention can be decoded and reproduced by performing a procedure opposite to the procedure of the signal processing performed by the digital video signal recording apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording apparatus for recording a video signal on a recording medium, the video signal including a luminance signal, a first color difference signal and a second color difference signal, the recording apparatus comprising:

a mode setting section for setting a recording mode, the recording mode being one of a standard recording mode and a long-time recording mode having a longer recording time than that of the standard recording mode;

a sampling section for sampling the luminance signal, the first color difference signal and the second color difference signal at a sampling number corresponding to the recording mode set by the mode setting section, the sample number of the luminance signal in the long-time recording mode being substantially equal to the three-quarters of the sample number of the luminance signal in the standard recording mode, the sample number of the first color difference signal in the long-time recording mode being substantially equal to one-half of the sample number of the first color difference signal in the standard recording mode, the sample number of the second color difference signal in the long-time recording mode being substantially equal to one-half of the sample number of the second color difference signal in the standard recording mode, a ratio between the sample number of the luminance signal, the sample number of the first color difference signal and the sample number of the second color difference signal being substantially equal to 4:1:1 in the standard recording mode;

a macro block generating section for generation a first macro block in the standard recording mode and generating a second macro block in the long-time recording mode, the first macro block including the luminance signal, the first color difference signal and the second color difference signal at a ratio of 4:1:1, the second macro block including the luminance signal, the first color difference signal and the second color difference signal at a ratio of 6:1:1;

a coding section for coding the first macro block and the second macro block so that an amount of coded data corresponding to the first macro block becomes substantially equal to an amount of coded data corresponding to the second macro block, so as to generate coded data; and a recording section for recording the coded data on the recording medium.

2. A recording apparatus according to claim 1, wherein the sampling section includes:

a luminance signal sampling section for sampling the luminance signal at a sampling frequency corresponding to the recording mode set by the mode setting section.

3. A recording apparatus according to claim 2, wherein the sampling frequency in the standard recording mode is 13.5 Mhz, and the sampling frequency in the long-time recording mode is 10.125 MHz.

4. A recording apparatus according to claim 2, wherein the sampling section further includes:

a restraining section for restraining a gain of the luminance signal sampled by the luminance signal sampling section in a frequency band exceeding a predetermined frequency in accordance with the recording mode set by the mode setting section.

5. A recording apparatus according to claim 1, wherein the sampling section includes:

a first line decimating section for determining whether it decimates lines with respect to the first color difference signal in accordance with the recording mode set by the setting section; and a second line decimating section for determining whether it decimates lines with respect to the second color difference signal in accordance with the recording mode set by the mode setting section.

6. A recording apparatus according to claim 1, wherein the sampling section includes:

a rate change section for changing a rate at which the luminance signal is sampled in accordance with the recording mode set by the mode setting section.

7. A recording apparatus according to claim 6, wherein the sampling section further includes:

a restraining section for restraining a gain of the luminance signal sampled at the rate changed by the rate changing section in a frequency band exceeding a predetermined frequency in accordance with the recording mode set by the mode setting section.

* * * * *